United States Patent
Tezuka et al.

(10) Patent No.: US 10,540,257 B2
(45) Date of Patent: Jan. 21, 2020

(54) INFORMATION PROCESSING APPARATUS AND COMPUTER-IMPLEMENTED METHOD FOR EVALUATING SOURCE CODE

(71) Applicant: FUJITSU LIMITED, Kawasaki-shi, Kanagawa (JP)

(72) Inventors: Toru Tezuka, Ota (JP); Masatoshi Morisaki, Urayasu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/899,965

(22) Filed: Feb. 20, 2018

(65) Prior Publication Data
US 2018/0267883 A1 Sep. 20, 2018

(30) Foreign Application Priority Data

Mar. 16, 2017 (JP) .................. 2017-051906

(51) Int. Cl.
| | |
|---|---|
| G06F 11/36 | (2006.01) |
| G06N 3/08 | (2006.01) |
| G06F 8/00 | (2018.01) |
| G06F 8/33 | (2018.01) |
| G06F 8/73 | (2018.01) |
| G06N 3/10 | (2006.01) |

(52) U.S. Cl.
CPC .......... *G06F 11/3624* (2013.01); *G06F 8/00* (2013.01); *G06F 8/33* (2013.01); *G06F 8/73* (2013.01); *G06F 11/3604* (2013.01); *G06F 11/3608* (2013.01); *G06N 3/08* (2013.01); *G06N 3/105* (2013.01)

(58) Field of Classification Search
CPC ..... G06F 8/20; G06F 8/30; G06F 8/31; G06F 8/33; G06F 8/427; G06F 11/323; G06F 11/3664; G06F 11/3688
USPC ..................................................... 717/125
See application file for complete search history.

(56) References Cited

U.S. PATENT DOCUMENTS

| | | | | |
|---|---|---|---|---|
| 9,971,581 | B1 * | 5/2018 | Nandanuru | G06F 8/52 |
| 2006/0012610 | A1 * | 1/2006 | Karlov | G09G 5/28 345/613 |
| 2008/0120269 | A1 * | 5/2008 | Venolia | G06F 17/30716 |
| 2010/0322489 | A1 * | 12/2010 | Tizhoosh | G06K 9/6253 382/128 |
| 2013/0301879 | A1 * | 11/2013 | Polo | G06K 9/3241 382/103 |
| 2014/0047413 | A1 * | 2/2014 | Sheive | H04L 65/403 717/110 |
| 2015/0033202 | A1 | 1/2015 | Wilson et al. | |

(Continued)

FOREIGN PATENT DOCUMENTS

| | | |
|---|---|---|
| JP | 2013-134521 | 7/2013 |
| JP | 2014-203228 | 10/2014 |

(Continued)

*Primary Examiner* — John Q Chavis

(74) *Attorney, Agent, or Firm* — Fujitsu Patent Center

(57) ABSTRACT

An information processing apparatus includes a memory and a processor coupled to the memory. The processor is configured to obtain a source code. The processor is configured to generate color information by executing conversion processing with regard to the source code while following a rule for converting a character into a color or converting a color of a character in accordance with a type of the character. The processor is configured to output the generated color information.

20 Claims, 18 Drawing Sheets

(56) References Cited

U.S. PATENT DOCUMENTS

| | | | |
|---|---|---|---|
| 2015/0128074 A1* | 5/2015 | De Angelis | G06F 3/04845 |
| | | | 715/763 |
| 2015/0143209 A1* | 5/2015 | Sudai | G06F 17/248 |
| | | | 715/202 |
| 2015/0254555 A1* | 9/2015 | Williams, Jr. | G06N 3/0454 |
| | | | 706/14 |
| 2015/0340016 A1* | 11/2015 | Lablans | G09G 5/395 |
| | | | 345/643 |
| 2016/0179862 A1* | 6/2016 | Allen | G06F 17/3053 |
| | | | 707/748 |
| 2017/0212829 A1* | 7/2017 | Bales | G06F 11/3664 |
| 2017/0213132 A1* | 7/2017 | Hammond | G06F 8/31 |
| 2018/0143893 A1* | 5/2018 | Oyaide | G06F 8/43 |
| 2018/0150742 A1* | 5/2018 | Woulfe | G06F 11/362 |

FOREIGN PATENT DOCUMENTS

| | | |
|---|---|---|
| JP | 2015-26365 | 2/2015 |
| JP | 2016-177359 | 10/2016 |

\* cited by examiner

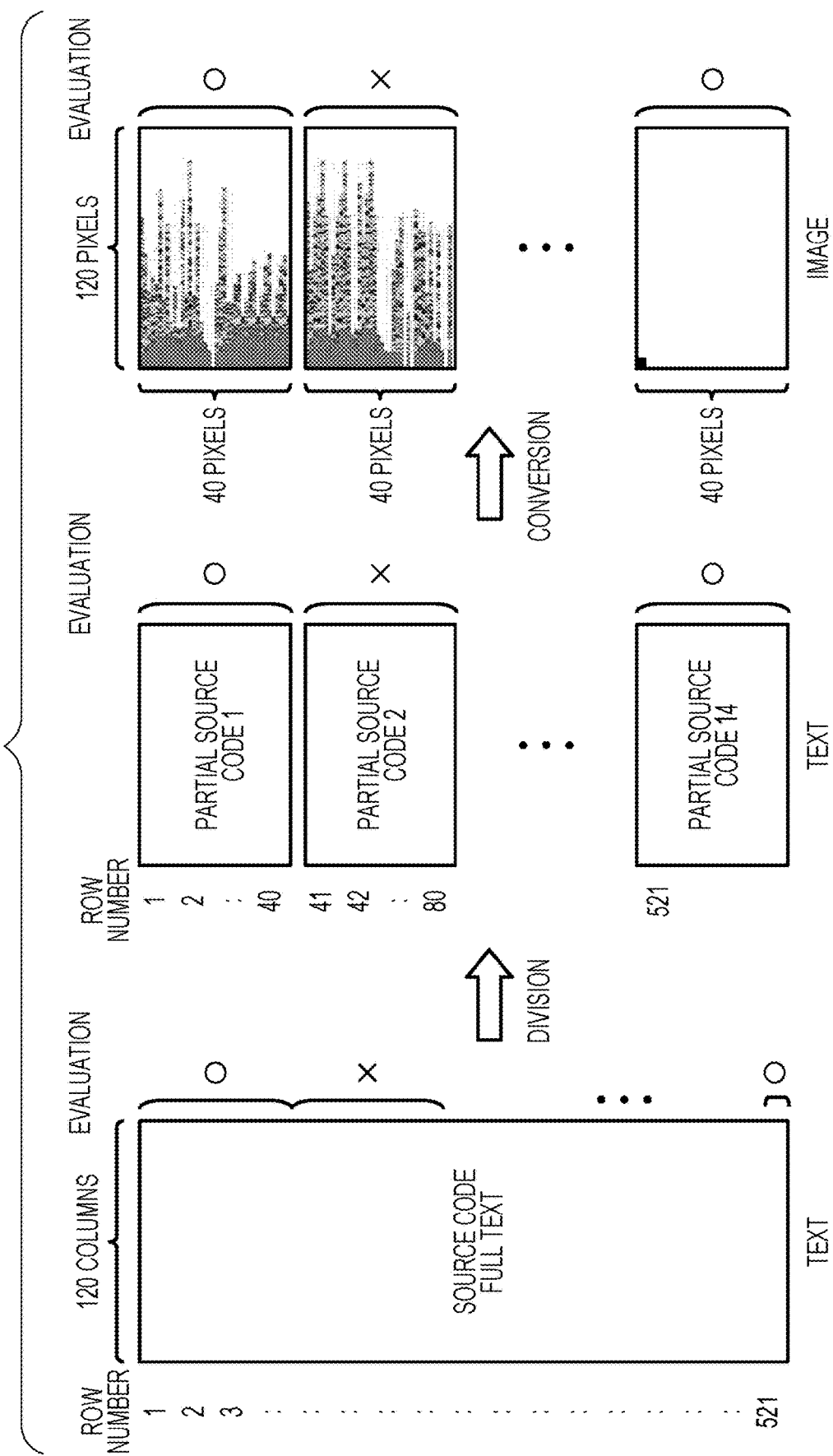

INFORMATION PROCESSING APPARATUS AND COMPUTER-IMPLEMENTED METHOD FOR EVALUATING SOURCE CODE

CROSS-REFERENCE TO RELATED APPLICATION

This application is based upon and claims the benefit of priority of the prior Japanese Patent Application No. 2017-51906, filed on Mar. 16, 2017, the entire contents of which are incorporated herein by reference.

FIELD

The embodiments discussed herein are related to an information processing apparatus, a computer-implemented method for evaluating source code, and a non-transitory computer-readable medium storing a program.

BACKGROUND

A static analysis on a source code has been proposed. For example, a problem related to a quality such as a violation against coding conventions is discovered by the static analysis. When the source code passes the static analysis, an evaluator of the source code who is also called a reviewer or the like evaluates (reviews) the source code. The evaluator takes an analysis result of the static analysis into considerations and further evaluates the source code based on evaluation standpoints such as high maintainability of the source code and scarcity of potential bugs.

Japanese Laid-open Patent Publication No. 2013-134521 discusses a related art technology.

However, since the evaluator evaluates the source code by a visual inspection, a problem occurs that the evaluation is not efficient.

SUMMARY

According to an aspect of the present invention, provided is an information processing apparatus including a memory and a processor coupled to the memory. The processor is configured to obtain a source code. The processor is configured to generate color information by executing conversion processing with regard to the source code while following a rule for converting a character into a color or converting a color of a character in accordance with a type of the character. The processor is configured to output the generated color information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is an explanatory diagram for describing an example of processing of an imaging tool according to the first exemplary embodiment;

DESCRIPTION OF EMBODIMENTS

First, a comparative example is simply described before exemplary embodiments of the present disclosure will be described. For example, when source codes that have passed a static analysis concentrate on an evaluator, since the evaluator evaluates the source code by a visual inspection, a problem occurs that load is imposed on the evaluator. In the above-mentioned case, it is presumed that part of the evaluation performed by the evaluator is performed, for example, by an artificial intelligence. When the artificial intelligence can learn evaluation standpoints of the evaluator as training data, the artificial intelligence handles the part of the evaluation with respect to the source code, and the load on the evaluator is reduced.

However, in a case where an image of part of the source code which is cut out by a screen shot and an evaluation with respect to the image are input to the artificial intelligence as the training data for learning, a size of the input image is equivalent to a size of a screen (specifically, a size of a display). In a case where the image having the above-mentioned size is input to the artificial intelligence for learning, a problem occurs that it takes time to perform the learning of the training data. In view of the above, descriptions will be provided of exemplary embodiments in which the training data with short learning time can be generated.

Hereinafter, the exemplary embodiments of the present disclosure will be described with reference to the drawings.

First Exemplary Embodiment

Figure 1:
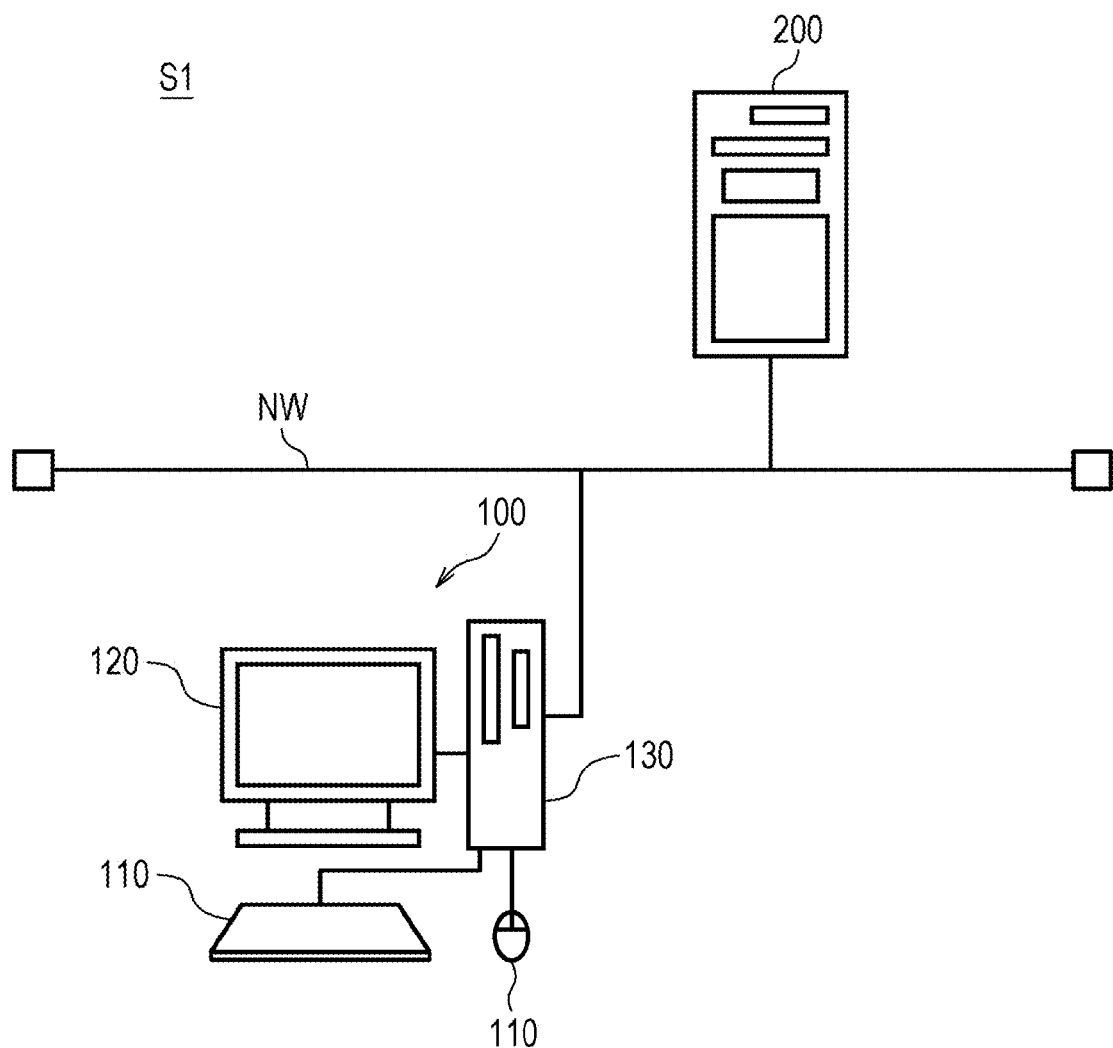
FIG. 1 illustrates an example of a source code review system according to a first exemplary embodiment.

FIG. 1 illustrates an example of a source code review system 51 according to a first exemplary embodiment. The source code review system 51 includes a terminal apparatus 100 and a server apparatus 200 functioning as an information processing apparatus. The terminal apparatus 100 and the server apparatus 200 are installed in the same base (for example, an office or the like). The terminal apparatus 100 and the server apparatus 200 are connected to each other by a communication network NW. A local area network (LAN) is used as the communication network NW, for example. It is noted that a personal computer (PC) is illustrated as an example of the terminal apparatus 100 in FIG. 1, but the terminal apparatus 100 is not limited to the PC and may also be, for example, a smart device such as a smart phone or a tablet terminal.

The terminal apparatus 100 includes the input apparatus 110, a display apparatus 120, and a control apparatus 130. The control apparatus 130 accepts an input of information from the input apparatus 110 and controls display contents of the display apparatus 120. The control apparatus 130 also accepts an input from the input apparatus 110 to transmit various information to the server apparatus 200 or receive various information transmitted from the server apparatus 200. For example, when information for requesting an evaluation with respect to a source code set as an evaluation target is input from the input apparatus 110, the control apparatus 130 accepts the input of the information and requests the server apparatus 200 to perform the evaluation of the source code. When the server apparatus 200 receives the request, the server apparatus 200 evaluates the source code of the evaluation target and transmits an evaluation result to the control apparatus 130. When the control apparatus 130 receives the evaluation result, the control apparatus 130 displays the evaluation result on the display apparatus 120.

Hereinafter, a detail of the server apparatus 200 will be described with reference to the drawings.

Figure 2:
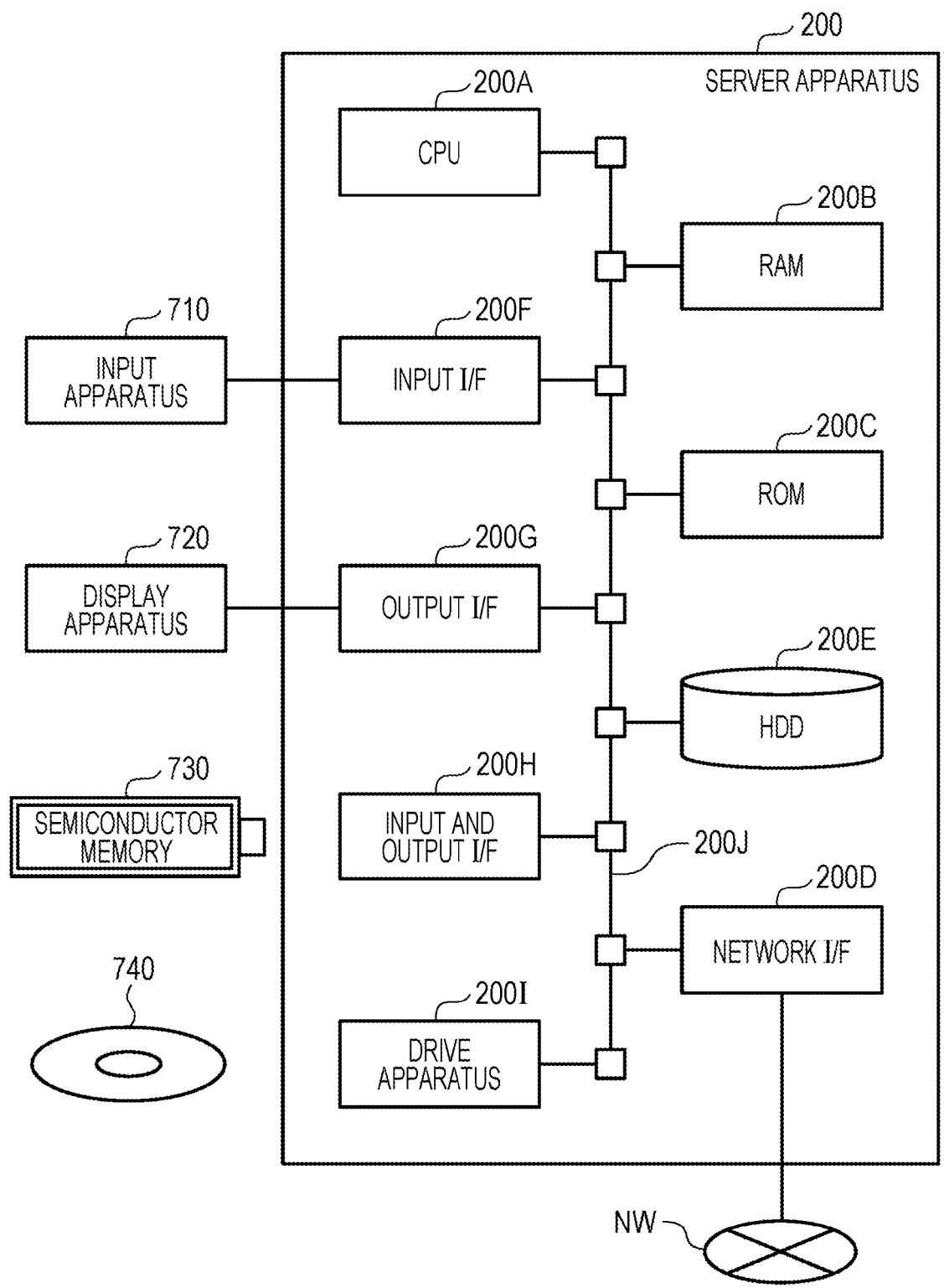
FIG. 2 illustrates an example of a hardware configuration of a server apparatus.

FIG. 2 illustrates an example of a hardware configuration of the server apparatus 200. It is noted that the terminal apparatus 100 described above basically has a hardware configuration similar to the server apparatus 200, and descriptions thereof will be omitted.

As illustrated in FIG. 2, the server apparatus 200 includes at least a central processing unit (CPU) 200A, a random access memory (RAM) 200B, a read only memory (ROM) 200C, and a network interface (I/F) 200D. The server apparatus 200 may include at least one of a hard disk drive (HDD) 200E, an input I/F 200F, an output I/F 200G, an input and output I/F 200H, and a drive apparatus when appropriate. The components including the CPU 200A to the drive apparatus 200I are mutually connected via the internal bus 200J. A computer is realized while at least the CPU 200A and the RAM 200B function in cooperation with each other.

An input apparatus 710 is connected to the input I/F 200F. For example, a key board, a mouse, or the like is used as the input apparatus 710. It is noted that the input apparatus 110 described above is also basically similar to the input apparatus 710.

A display apparatus 720 is connected to the output I/F 200G. A liquid crystal display is used as the display apparatus 720, for example. It is noted that the display apparatus 120 described above is also basically similar to the display apparatus 720.

A semiconductor memory 730 is connected to the input and output I/F 200H. For example, a universal serial bus (USB) memory, a flash memory, or the like is used as the semiconductor memory 730. The input and output I/F 200H reads a program or data stored in the semiconductor memory 730.

The input I/F 200F and the input and output I/F 200H include, for example, a USB port. The output I/F 200G includes, for example, a display port.

A portable recording medium 740 is inserted into the drive apparatus 200I. The portable recording medium 740 includes, for example, a removable disc such as a compact disc (CD)-ROM or a digital versatile disc (DVD). The drive apparatus 200I reads a program or data recorded in the portable recording medium 740.

The network I/F 200D includes, for example, a LAN port. The network I/F 200D is connected to the communication network NW described above.

The programs stored in the ROM 200C and the HDD 200E are stored in the RAM 200B described above by the CPU 200A. The program recorded in the portable recording medium 740 is stored in the RAM 200B by the CPU 200A. Various functions which will be described below are realized while the CPU 200A executes the stored programs, and various processing which will be described below are executed. It is noted that it is sufficient when the programs are based on flow charts which will be described below.

Figure 3:
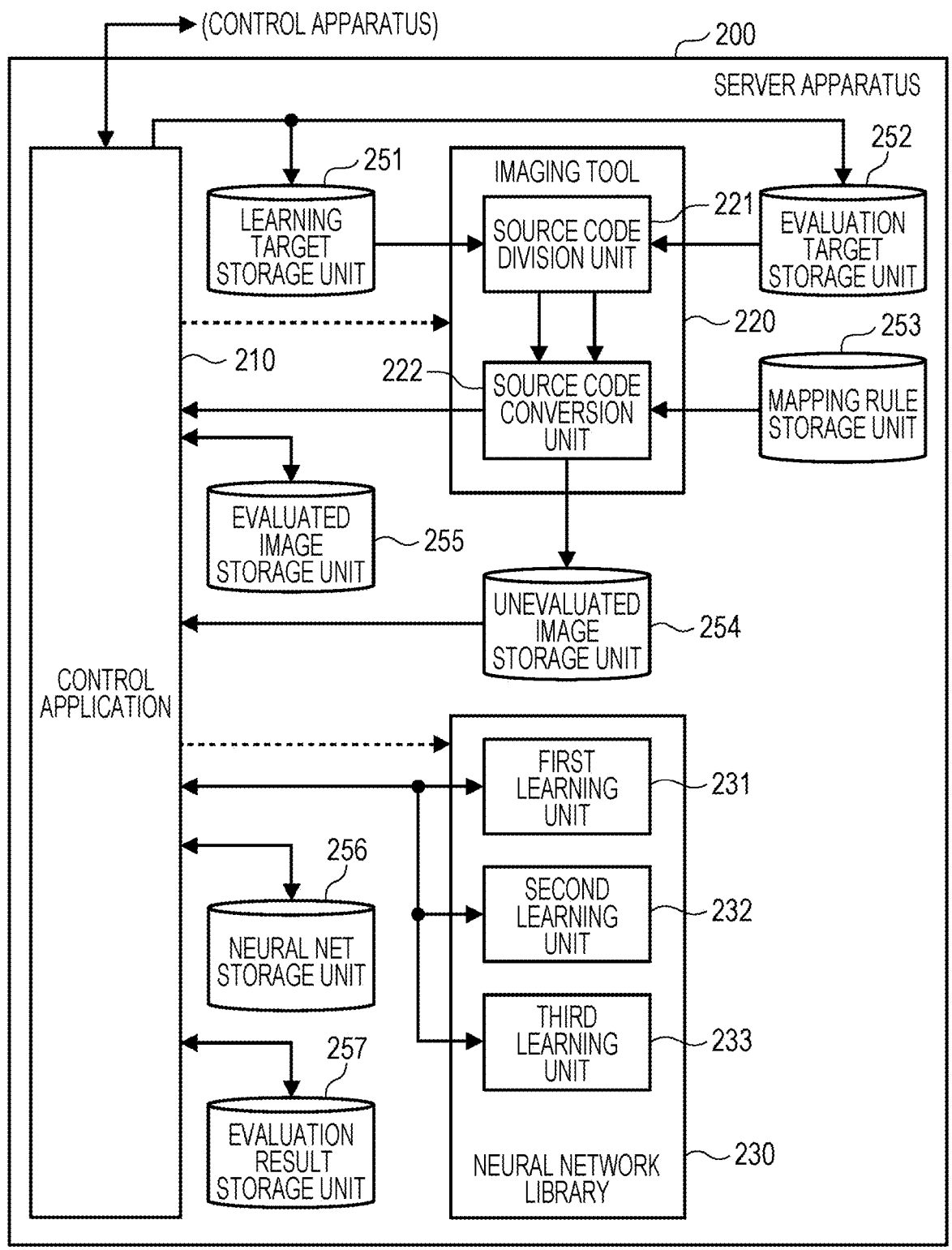
FIG. 3 is a block diagram example of the server apparatus according to the first exemplary embodiment.
Figure 4B:
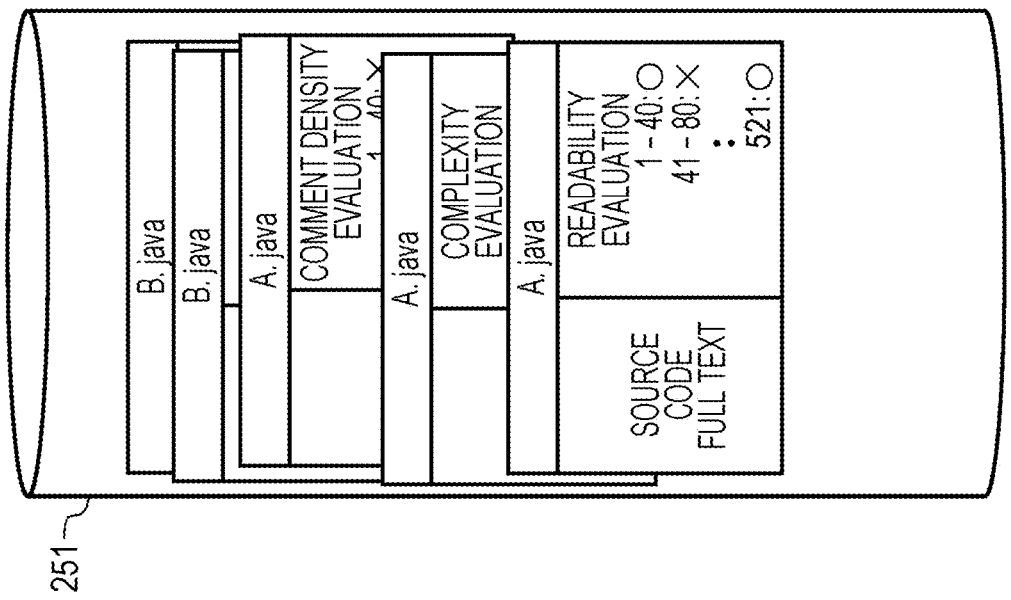
FIG. 4B illustrates an example of a learning target storage unit.
Figure 4A:
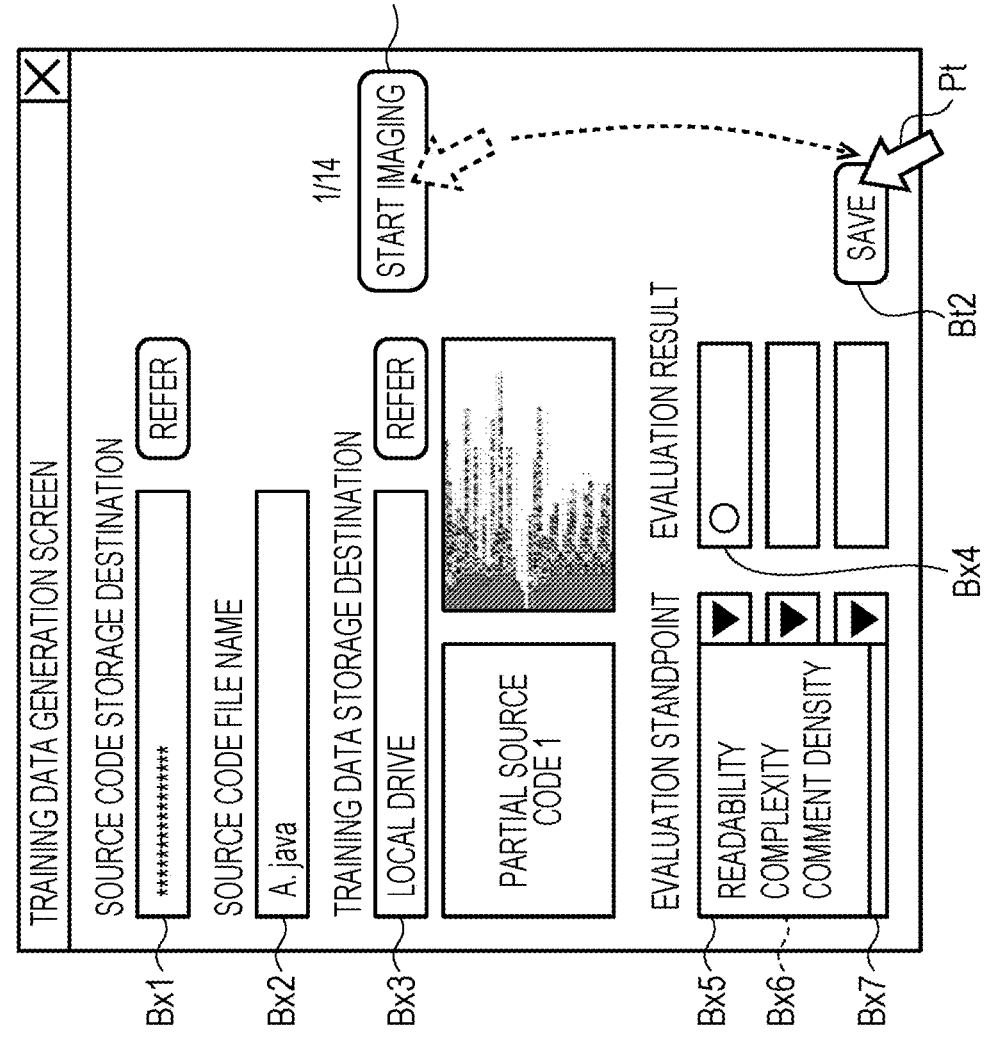
FIG. 4A illustrates an example of a training data generation screen.

FIG. 3 is a block diagram example of the server apparatus 200 according to the first exemplary embodiment. FIG. 4A illustrates an example of a training data generation screen. FIG. 4B illustrates an example of a learning target storage unit 251. In FIG. 3, a function configuration of the server apparatus 200 is represented in the form of a block diagram. The server apparatus 200 includes a control application 210, an imaging tool 220, and a neural network library or machine learning library (hereinafter, which will be simply referred to as a neural network library) 230. The control application 210 controls operations of the imaging tool 220 and the neural network library 230. For example, when the control application 210 receives the above-mentioned request from the control apparatus 130, the control application 210 drives the imaging tool 220 and the neural network library 230. As a result, the imaging tool 220 and the neural network library 230 respectively execute their own processing.

The imaging tool 220 executes processing for dividing the source code and converting the divided source codes into images. In other words, the imaging tool 220 divides the source code and images the divided source codes. As illustrated in FIG. 3, the imaging tool 220 includes a source code division unit 221 and a source code conversion unit 222.

The source code division unit 221 divides the source code into a plurality of partial source codes for every predetermined number of rows. For example, the source code division unit 221 obtains a source code set as a learning target stored as training data by the learning target storage unit 251 and divides the obtained source code into a plurality of partial source codes for every 40 rows. Similarly, the source code division unit 221 obtains a source code set as an evaluation target stored by an evaluation target storage unit 252 and divides the obtained source code into a plurality of partial source codes for every 40 rows.

Herein, the learning target storage unit 251 stores a source code full text as the training data in a plurality of evaluation standpoints to which an evaluation is previously assigned in units of predetermined rows. For example, as illustrated in FIG. 4A, the evaluator operates the input apparatus 110 to display the training data generation screen (hereinafter, which will be simply referred to as a generation screen) on the display apparatus 120. The generation screen has a function equivalent to the imaging tool 220. The evaluator inputs a storage destination (for example, a folder name or the like) of a source code that has been created by a programmer in an input field Bx1 included in the generation screen and inputs a name (for example, a file name) of the source code in an input field Bx2. The evaluator also inputs a storage destination of training data in an input field Bx3 and selects one evaluation standpoint (for example, "readability") from among the plurality of evaluation standpoints in an input field Bx5 while leaving an input field Bx4 for the evaluation result empty. It is noted that different evaluation items (for example, "complexity" and "comment density") from the evaluation item selected by the input field Bx5 may be selected in respective selection fields Bx6 and Bx7.

When the evaluator ends various inputs and selections, the evaluator operates the input apparatus 110 to instruct for pressing of an imaging start button Bt1 by a pointer Pt. As a result, the control apparatus 130 obtains the source code to which the file name is assigned from the storage destination of the source code based on the storage destination and the file name of the source code and divides the obtained source code into partial source codes to be displayed on the generation screen while being associated with the image of the partial source code. Imaging for converting the partial source code into an image is carried out in conformity to imaging rules (various mapping rules which will be described below) in accordance with the evaluation standpoint selected in the input field Bx5. Contents of the imaged source code can be checked by a visual inspection on the generation screen. The evaluator performs the evaluation by checking a displayed partial source code 1 or its imaging and inputs an evaluation result "0" or "x" in the input field Bx4 for the evaluation result. The evaluation result "0" indicates a high grade, and the evaluation result "x" indicates a low grade.

Although results of the three evaluation standpoints can be input in the input field Bx4, the input is to be performed with regard to only the standpoint selected in the input field Bx5, and the evaluation results of the other standpoints can be omitted. When the inputs to all the three input fields Bx4 (including the omissions) are ended, the generation screen displays the partial source code and the image for the next 40 rows. The evaluator evaluates the displayed source code again and inputs the evaluation result. In this manner, the input of the evaluation is repeatedly performed in 40-row increments, and an instruction for pressing a save button Bt2 by the pointer Pt is performed by operating the input apparatus 110 in a stage where the evaluation is ended up to the last row.

As a result, the control apparatus 130 (for example, a local drive) stores the source code full text in the plurality of evaluation standpoints to which the evaluation is assigned in units of predetermined rows as the training data. Subsequently, when the control application 210 starts to generate learning units based on the instruction from the control apparatus 130, the control application 210 obtains the training data from the control apparatus 130 and stores the training data in the learning target storage unit 251 as illustrated in FIG. 4B.

The source code conversion unit 222 converts the plurality of partial source codes into images. One character column on the source code is mapped into one pixel on the image by this conversion. More specifically, when the source code conversion unit 222 obtains the plurality of partial source codes from the source code division unit 221, the source code conversion unit 222 obtains a mapping rule stored in a mapping rule storage unit 253. The mapping rule is information (for example, an electronic file) for replacing characters into different colors based on previously determined character types such as whether or not the character is previously defined by a programming language or whether or not the character can be previously arbitrarily defined by the programmer. For example, in a case where the programming language is Java (registered trademark), the character previously defined by the programming language includes a reserved word and the like, and the character that can be previously arbitrarily defined by the programmer includes an identifier such as a class name and a method name and the like. It is noted that the mapping rule will be described below in detail.

Figure 18A:
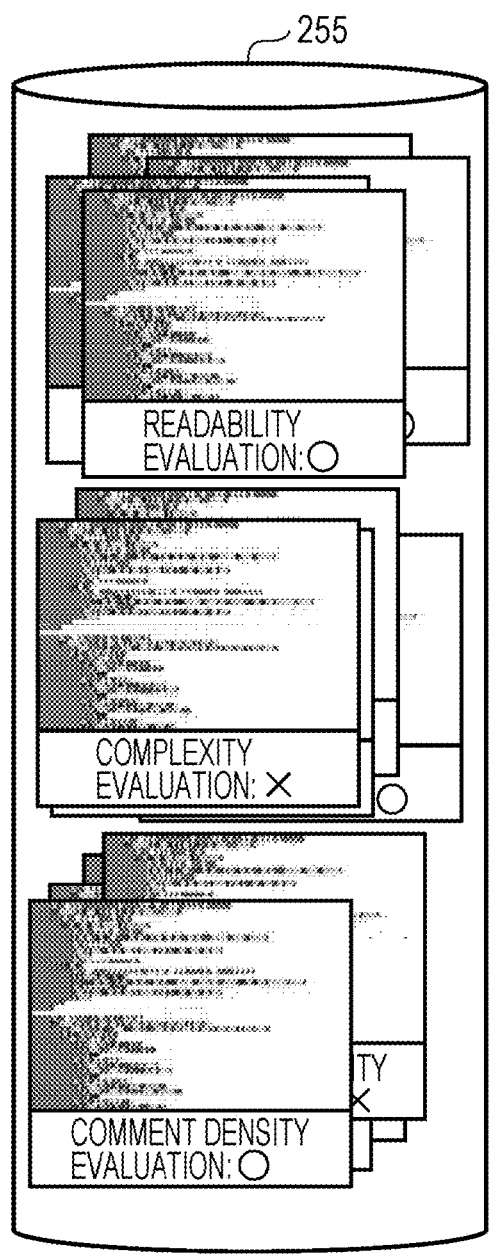
FIG. 18A illustrates an example of an evaluated image storage unit.
Figure 18B:
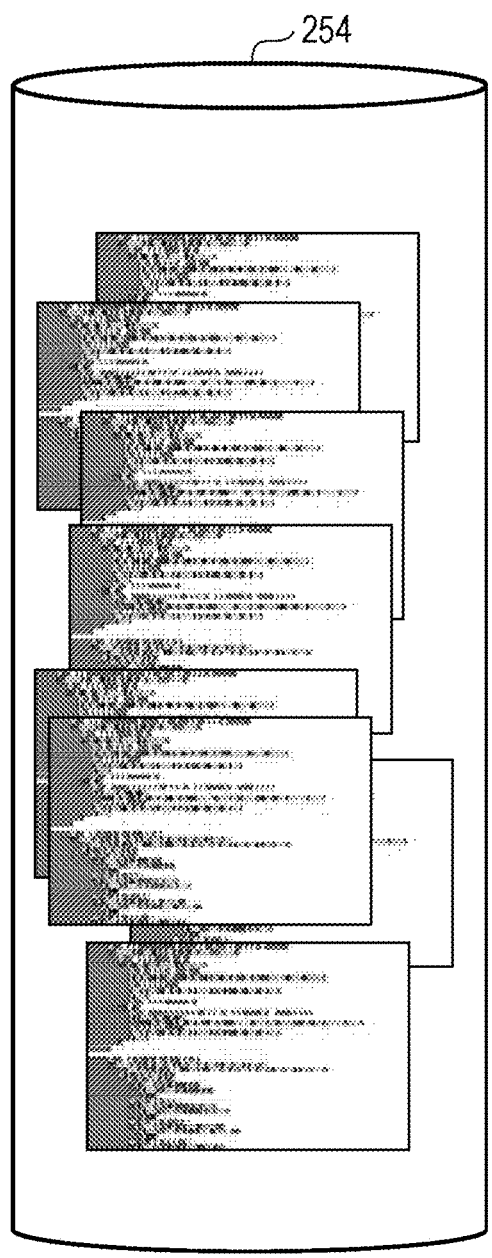
FIG. 18B illustrates an example of an unevaluated image storage unit.

When the source code conversion unit 222 obtains the mapping rule, the source code conversion unit 222 replaces characters included in each of the plurality of partial source codes into colored pixels based on the mapping rule. The source code conversion unit 222 then converts the plurality of partial source codes in which the characters are replaced with the colored pixels into images. In a case where a division source of the partial source code is the source code of the learning target, the source code conversion unit 222 stores the image in an evaluated image storage unit 255 via the control application 210 as an evaluated image. As a result, as illustrated in FIG. 18A, the evaluated image storage unit 255 stores a plurality of evaluated images. On the other hand, in a case where the division source of the partial source code is the source code of the evaluation target, the source code conversion unit 222 stores the image in an unevaluated image storage unit 254. As a result, as illustrated in FIG. 18B, the unevaluated image storage unit 254 stores a plurality of unevaluated images.

The neural network library 230 includes a first learning unit 231, a second learning unit 232, and a third learning unit 233. All of the first learning unit 231, the second learning unit 232, and the third learning unit 233 are generated as neural networks by the control application 210 to be stored in the neural network library 230. It is noted that the neural network library 230 may include one or two of the first learning unit 231, the second learning unit 232, and the third learning unit 233 or may also include a fourth learning unit (not illustrated) and the like in addition to the first learning unit 231, the second learning unit 232, and the third learning unit 233.

The first learning unit 231 learns an evaluated image of a first evaluation standpoint. For example, when the control application 210 obtains the evaluated image with regard to the readability of the source code from the evaluated image storage unit 255 to be input to the first learning unit 231, the first learning unit 231 learns the obtained evaluated image by way of deep learning. As a result, the first learning unit 231 can dynamically evaluate the readability of the source code. When the first learning unit 231 ends the learning of the evaluated image, the control application 210 obtains a learning result from the first learning unit 231 and saves the obtained learning result in a neural net storage unit 256 as the learned neural net of the first evaluation standpoint. It is noted that the readability represents a degree of ease for a person other than the programmer who reads a part other than a comment of the source code to understand its purpose and processing flow.

On the other hand, in a case where the image to which the evaluation is not yet assigned is input from the control application 210, the first learning unit 231 evaluates the readability of the part source code with respect to the input image. More specifically, in a case where the control application 210 accepts the source code of the evaluation target, the control application 210 generates the first learning unit 231 and inputs the learned neural net of the first evaluation standpoint to the first learning unit 231. Subsequently, the control application 210 obtains the image obtained by dividing the source code of the evaluation target into the image from the unevaluated image storage unit 254 to be input to the first learning unit 231. As a result, the first learning unit 231 evaluates the readability of the partial source code corresponding to the input image. When the first learning unit 231 ends the evaluation, the control application 210 obtains the evaluation result and stores the obtained evaluation result in an evaluation result storage unit 257. When the evaluation result storage unit 257 stores the evaluation result, the control application 210 obtains the evaluation result from the evaluation result storage unit 257 to be transmitted to the control apparatus 130. When the control apparatus 130 receives the evaluation result, the control apparatus 130 displays the evaluation result on the display apparatus 120.

It is noted that the second learning unit 232 is similar to the first learning unit 231 except for that the second learning unit 232 learns an evaluated image of a second evaluation standpoint and evaluates the partial source code corresponding to the image input from the control application 210 based on the second evaluation standpoint, and detailed descriptions will be omitted. The second evaluation standpoint includes the complexity of the source code or the like. For example, in a case where a nest (nested structure) of parenthesis symbols ("(" and ")") is deep, a case where dots (".") sandwiched by operator symbols (such as for example, "!", "=", "&&", or "||") are continuous, or a case where one sentence is described over a long row, the source code is evaluated as complex.

Similarly, the third learning unit 233 is similar to the first learning unit 231 except for that the third learning unit 233 learns an evaluated image of a third evaluation standpoint and evaluates the partial source code corresponding to the image input from the control application 210 based on the third evaluation standpoint, and detailed descriptions will be omitted. The third evaluation standpoint includes the comment density of the source code or the like. For example, in a case where a comment is not described immediately before a conditional branching (such as "if" or "else"), a control statement (such as, for example, "for" or "while") of repetitive processing, or the other control statement (such as, for example, "case" or "switch"), the source code is evaluated as lack of a comment.

Subsequently, an operation of the server apparatus 200 will be described.

Figure 5:
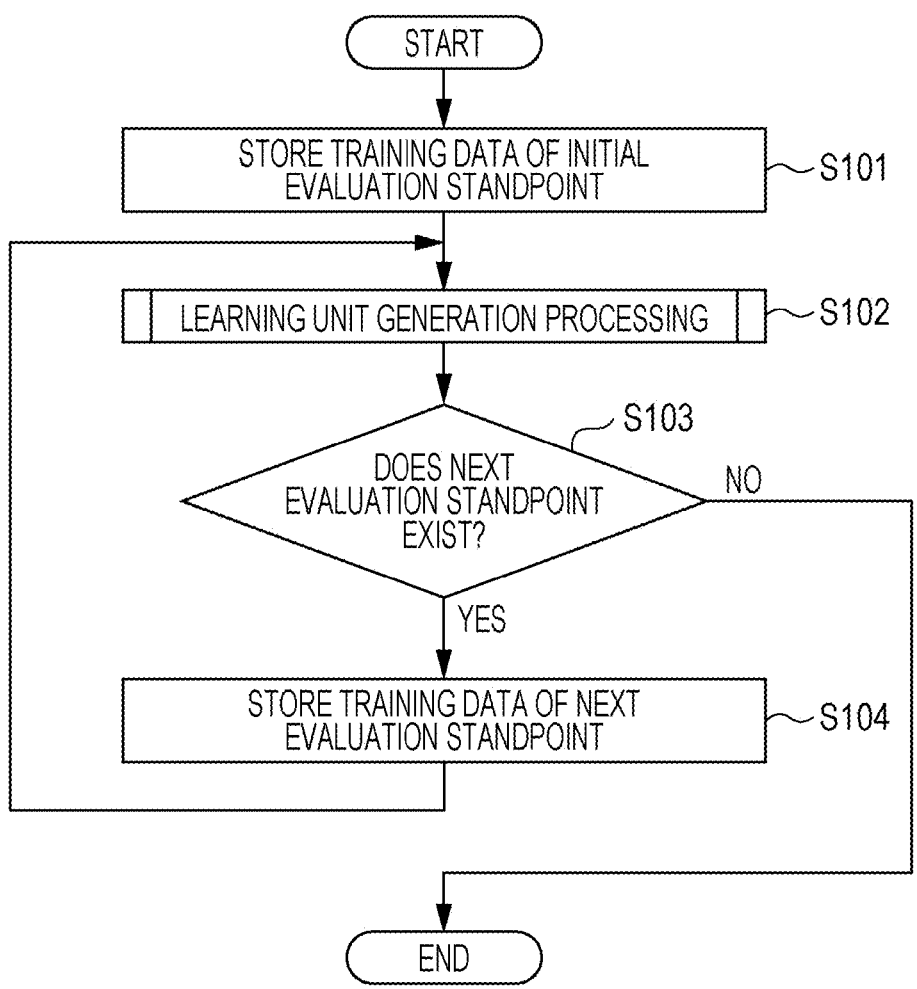
FIG. 5 is a flow chart illustrating an example of an operation of the server apparatus.

FIG. 5 is a flow chart illustrating an example of the operation of the server apparatus 200. More specifically, FIG. 5 is a flow chart illustrating an example of an operation related to learning unit generation.

First, as illustrated in FIG. 5, the control application 210 stores training data of an initial evaluation standpoint (step S101). For example, the control application 210 obtains the training data of the initial evaluation standpoint from the control apparatus 130 to be stored in the learning target storage unit 251. When the processing in step S101 is completed, the control application 210 then executes learning unit generation processing (step S102). The learning unit generation processing is processing for causing a neural network to learn the evaluated image and generating the first learning unit 231, the second learning unit 232, or the third learning unit 233 in accordance with evaluation standpoints. It is noted that a detail of the learning unit generation processing will be described below.

When the processing in step S102 is completed, the control application 210 then determines whether or not a next evaluation standpoint exists (step S103). For example, in a case where the control application 210 executes the learning unit generation processing with regard to the evaluation standpoint "the readability" but does not execute the learning unit generation processing with regard to the evaluation standpoint "the complexity" and the evaluation standpoint "the comment density", the control application 210 determines that the next evaluation standpoint exists (step S103: YES) and stores the training data of the next evaluation standpoint (step S104). For example, the control application 210 obtains the training data of the next evaluation standpoint from the control apparatus 130 to be stored in the learning target storage unit 251.

On the other hand, in a case where the execution of the learning unit generation processing with regard to all the evaluation standpoints is ended, the control application 210 determines that the next evaluation standpoint does not exist (step S103: NO). In this case, the control application 210 ends the processing.

Subsequently, a detail of the above-mentioned learning unit generation processing will be described with reference to FIG. 6 to FIGS. 10A and 10B.

Figure 6:
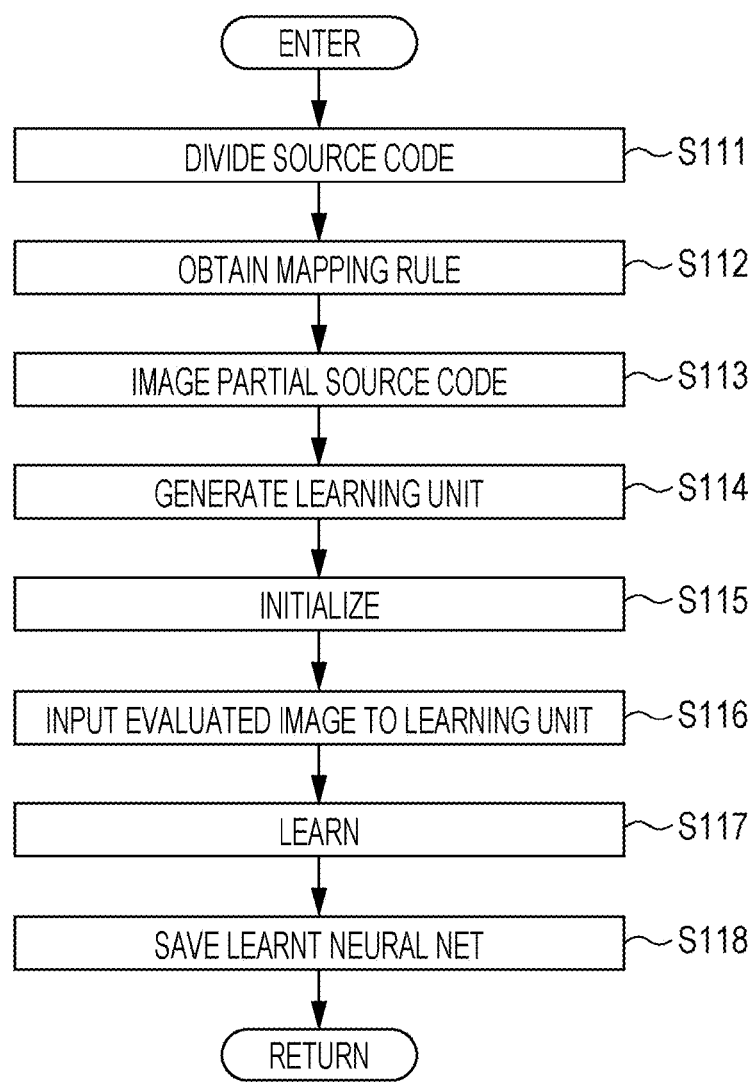
FIG. 6 is a flow chart illustrating an example of learning unit generation processing.
Figure 8A:
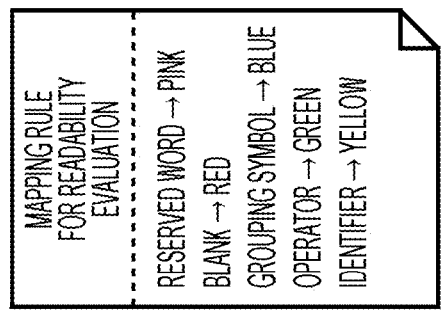
FIG. 8A illustrates an example of a mapping rule for a readability evaluation.
Figure 8B:
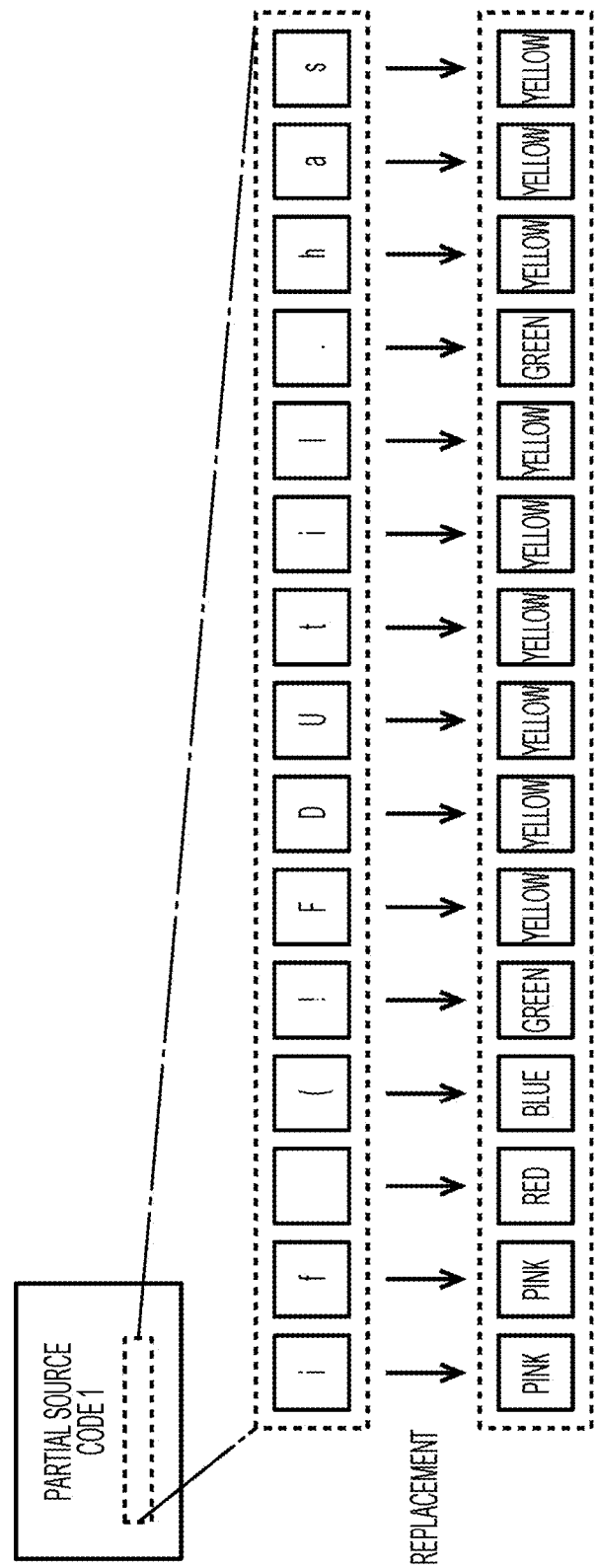
FIG. 8B is an explanatory diagram for describing an example of a replacement based on the mapping rule for the readability evaluation.
Figure 9A:
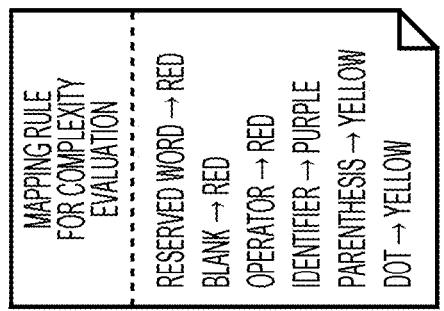
FIG. 9A illustrates an example of a mapping rule for a complexity evaluation.
Figure 9B:
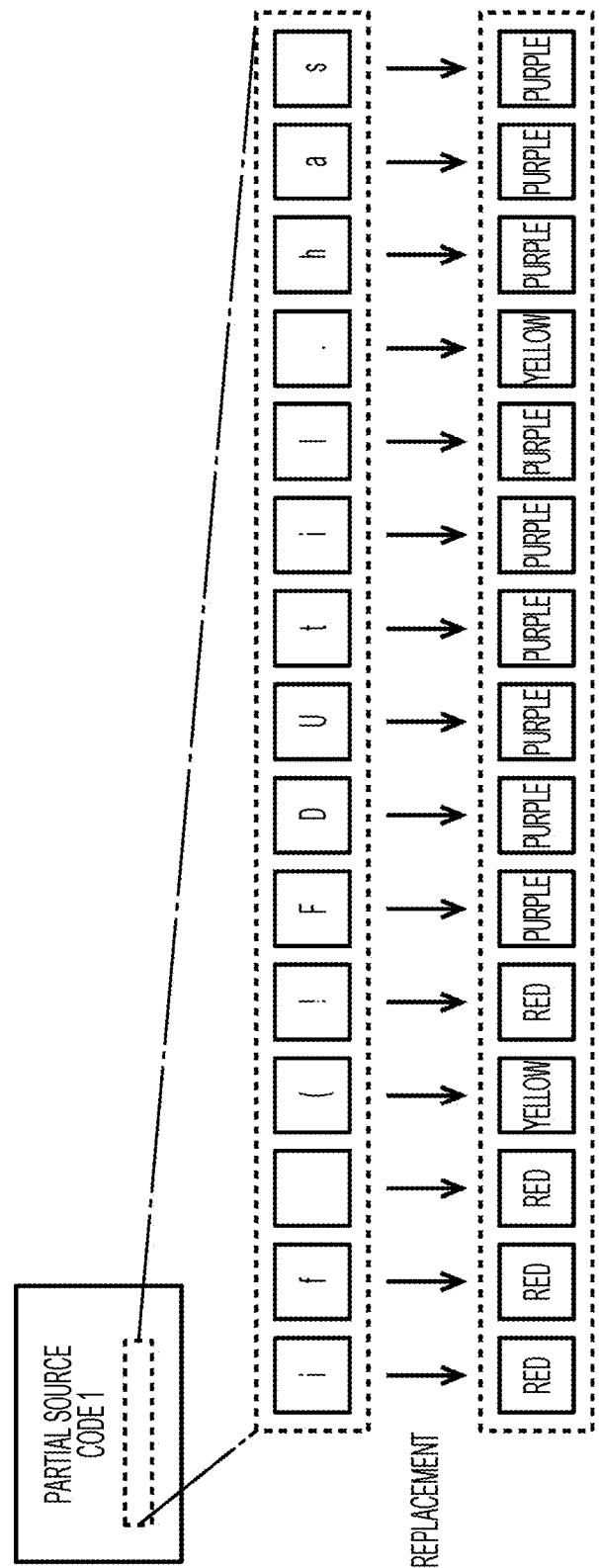
FIG. 9B is an explanatory diagram for describing an example of a replacement based on the mapping rule for the complexity evaluation.
Figure 10A:
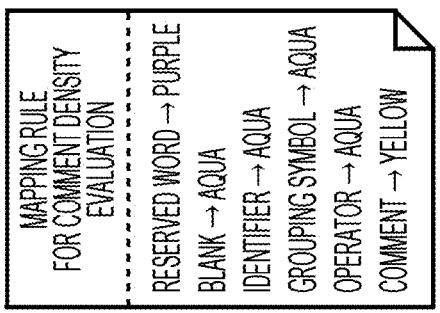
FIG. 10A illustrates an example of a mapping rule for a comment density evaluation.
Figure 10B:
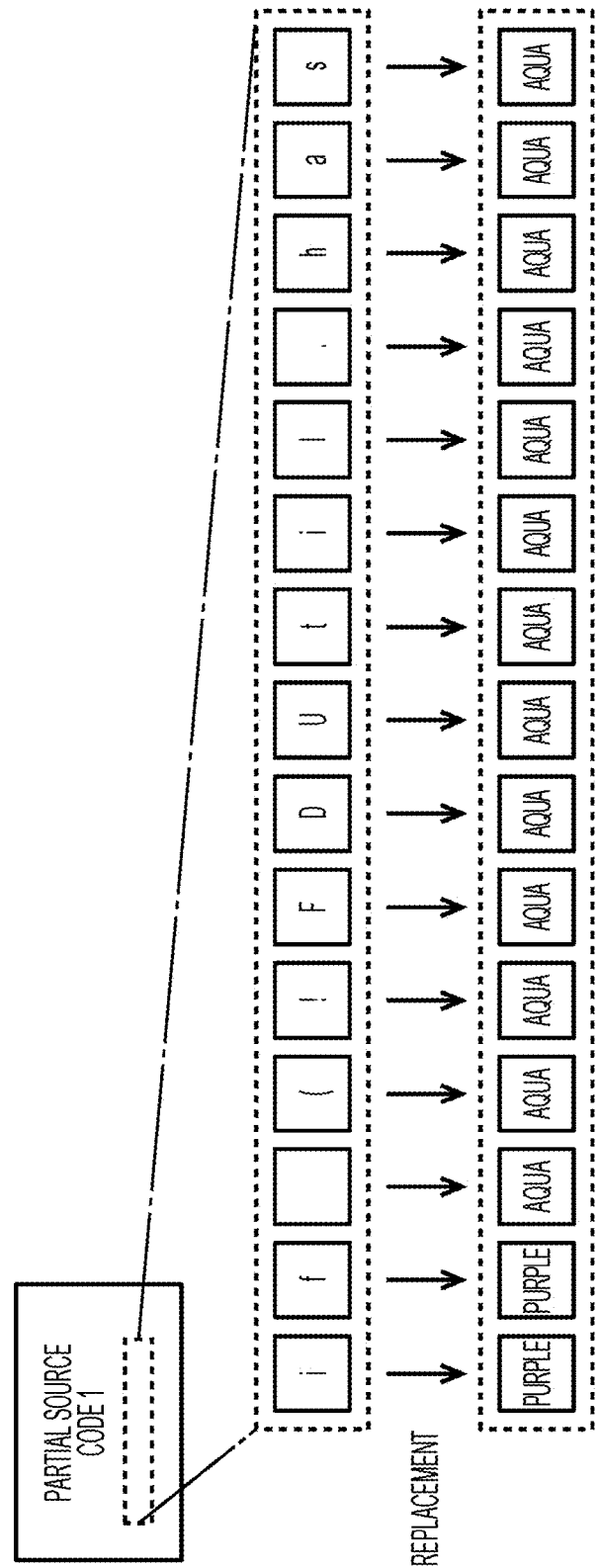
FIG. 10B is an explanatory diagram for describing an example of a replacement based on the mapping rule for the comment density evaluation.

FIG. 6 is a flow chart illustrating an example of the learning unit generation processing. FIG. 7 is an explanatory diagram for describing an example of processing of the imaging tool 220 according to the first exemplary embodiment. FIG. 8A illustrates an example of a mapping rule for a readability evaluation. FIG. 8B is an explanatory diagram for describing an example of a replacement based on the mapping rule for the readability evaluation. FIG. 9A illustrates an example of a mapping rule for a complexity evaluation. FIG. 9B is an explanatory diagram for describing an example of a replacement based on the mapping rule for the complexity evaluation. FIG. 10A illustrates an example of a mapping rule for a comment density evaluation. FIG. 10B is an explanatory diagram for describing an example of a replacement based on the mapping rule for the comment density evaluation.

First, when the processing in step S101 described with reference to FIG. 5 is completed, as illustrated in FIG. 6, the source code division unit 221 divides the source code (step S111). More specifically, the source code division unit 221 obtains the training data stored in the learning target storage unit 251 and divides the source code of the obtained training data. For example, as illustrated in FIG. 7, in a case where the learning target storage unit 251 stores a source code of a text type including a source code full text corresponding to 120 columns (specifically, for 120 characters)×521 rows, the source code division unit 221 divides the source code into a plurality of partial source codes in a state in which evaluations assigned in units of predetermined rows are maintained. Since the source code division unit 221 divides the source code in units of 40 rows according to the present exemplary embodiment, the source code division unit 221 divides the source code into partial source codes 1 to 14. It is noted that the unit number of rows may be appropriately changed.

When the processing in step S111 is completed, the source code conversion unit 222 then obtains a mapping rule (step S112). More specifically, the source code conversion unit 222 obtains the mapping rule in accordance with the target evaluation standpoint from the mapping rule storage unit 253. Herein, the mapping rule storage unit 253 previously stores a plurality of types of mapping rules.

Specifically, as illustrated in FIG. 8A, FIG. 9A, and FIG. 10A, the mapping rule storage unit 253 previously stores the mapping rule for the readability evaluation, the mapping rule for the complexity evaluation, and the mapping rule for the comment density evaluation. The mapping rule for the readability evaluation is information for defining a replacement that is appropriate when the readability of the source code (to be more specific, the partial source code) is evaluated. Similarly, the mapping rule for the complexity evaluation is information for defining a replacement that is appropriate when the complexity of the source code is evaluated. The mapping rule for the comment density evaluation is information for defining a replacement that is appropriate when the comment density of the source code is evaluated. The source code conversion unit 222 obtains one of the mapping rule for the readability evaluation, the mapping rule for the complexity evaluation, and the mapping rule for the comment density evaluation from the mapping rule storage unit 253 in accordance with the target evaluation standpoint.

When the processing in step S112 is completed, the source code conversion unit 222 then images the partial source code as illustrated in FIG. 6 (step S113). More specifically, in a state in which the evaluations are maintained, the source code conversion unit 222 converts the plurality of partial source codes 1 to 14 into a plurality of image files based on the obtained mapping rule as illustrated in FIG. 7. In particular, the source code conversion unit 222 converts the plurality of partial source codes 1 to 14 into the plurality of images while one row is associated to be equivalent to one pixel in height, and one column is associated to be equivalent to one pixel in width. Therefore, the source code conversion unit 222 generates 14 images having 40 pixels× 120 pixels in accordance with the partial source codes 1 to 14. All of the 14 images include a single color or a plurality of colors.

Herein, in a case where the source code conversion unit 222 obtains the mapping rule for the readability evaluation, first, characters included in the partial source code 1 are replaced with colors based on the obtained mapping rule for the readability evaluation as illustrated in FIG. 8B. For example, the source code conversion unit 222 converts both the two characters of the reserved word "if" into pink. For example, the source code conversion unit 222 converts all of the six characters of the identifier "FDUtil" and the three characters of the identifier "has" into yellow. The same similarly applies to the rest of the characters, and the source code conversion unit 222 converts the characters into colors based on the mapping rule for the readability evaluation. As a result, the source code conversion unit 222 generates an image including a plurality of colors which is appropriate to the evaluation of the readability of the partial source code 1. When the source code conversion unit 222 ends the imaging of the partial source code 1, the source code conversion unit 222 similarly sequentially performs the imaging with respect to the partial source codes 2 to 14. When the source code conversion unit 222 generates the plurality of images, the source code conversion unit 222 outputs the plurality of images associated with the evaluations to the control application 210, and the control application 210 stores the control application 210 stores the plurality of images associated with the evaluations in the evaluated image storage unit 255 as the evaluated images (see FIG. 18A).

With reference to FIG. 6 again, when the processing in step S113 is completed, the control application 210 then generates a learning unit (step S114). For example, when the control application 210 stores the evaluated image in the evaluated image storage unit 255, the control application 210 starts to generate the first learning unit 231 and stores the first learning unit 231 in the neural network library 230. When the processing in step S114 is completed, the control application 210 then initializes the learning unit (step S115). For example, in a case where the control application 210 generates the first learning unit 231, the control application 210 initializes the first learning unit 231.

When the processing in step S115 is completed, the control application 210 then inputs the evaluated image to the learning unit (step S116). For example, the control application 210 obtains the evaluated image stored in the evaluated image storage unit 255 to be input to the first learning unit 231. When the processing in step S116 is completed, the learning unit performs learning (step S117). Therefore, the first learning unit 231 learns the input evaluated image. That is, the first learning unit 231 learns the image to which the evaluation of the readability is assigned. When the processing in step S117 is completed, the first learning unit 231 saves a learnt neural net (step S118). That is, when the first learning unit 231 ends the learning of the image, the first learning unit 231 saves the learnt neural net representing the learning result with regard to the evaluation standpoint of the readability in the neural net storage unit 256. When the processing in step S118 is completed, the processing in step S103 described with reference to FIG. 5 is started.

Therefore, in a case where the next evaluation standpoint exists, the control application 210 similarly executes the learning unit generation processing with respect to the source code of the next evaluation standpoint. For example, in a case where the complexity is evaluated as the next evaluation standpoint, the characters included in the partial source code 1 are replaced with colors based on the mapping rule for the complexity evaluation with respect to the partial source code 1 as illustrated in FIG. 9B. For example, the source code conversion unit 222 converts both the two characters of the reserved word "if" into red. For example, the source code conversion unit 222 converts all of the six characters of the identifier "FDUtil" and the three characters of the identifier "has" into purple. Similarly, the source code conversion unit 222 converts the characters into colors based on the mapping rule for the complexity evaluation with regard to the rest of the characters. The partial source code 2 to the partial source code 14 are also similarly processed as in the partial source code 1. As a result, the evaluated image storage unit 255 stores the plurality of images to which the evaluations of the complexity are assigned as the evaluated images (see FIG. 18A). When the second learning unit 232 ends the learning of the images, the second learning unit 232 saves the learnt neural net representing the learning result with regard to the evaluation standpoint of the complexity in the neural net storage unit 256.

In addition, for example, in a case where the comment density is evaluated as the next evaluation standpoint, the characters included in the partial source code 1 are replaced with colors based on the mapping rule for the comment density evaluation with respect to the partial source code 1 as illustrated in FIG. 10B. For example, the source code conversion unit 222 converts both the two characters of the reserved word "if" into purple. For example, the source code conversion unit 222 converts all of the six characters of the identifier "FDUtil" and the three characters of the identifier "has" into aqua. Similarly, with regard to the rest of the characters, the source code conversion unit 222 converts the characters into colors based on the mapping rule for the comment density evaluation. The partial source code 2 to the partial source code 14 are also similarly processed as in the partial source code 1. As a result, the evaluated image storage unit 255 stores the plurality of images to which the evaluations of the comment density as the evaluated images (see FIG. 18A). When the third learning unit 233 ends the learning of the image, the third learning unit 233 saves the learnt neural net representing the learning result with regard to the evaluation standpoint of the comment density in the neural net storage unit 256.

Subsequently, evaluation processing for performing an evaluation with respect to the source code to which the evaluation is not yet assigned will be described with reference to FIG. 11.

Figure 11:
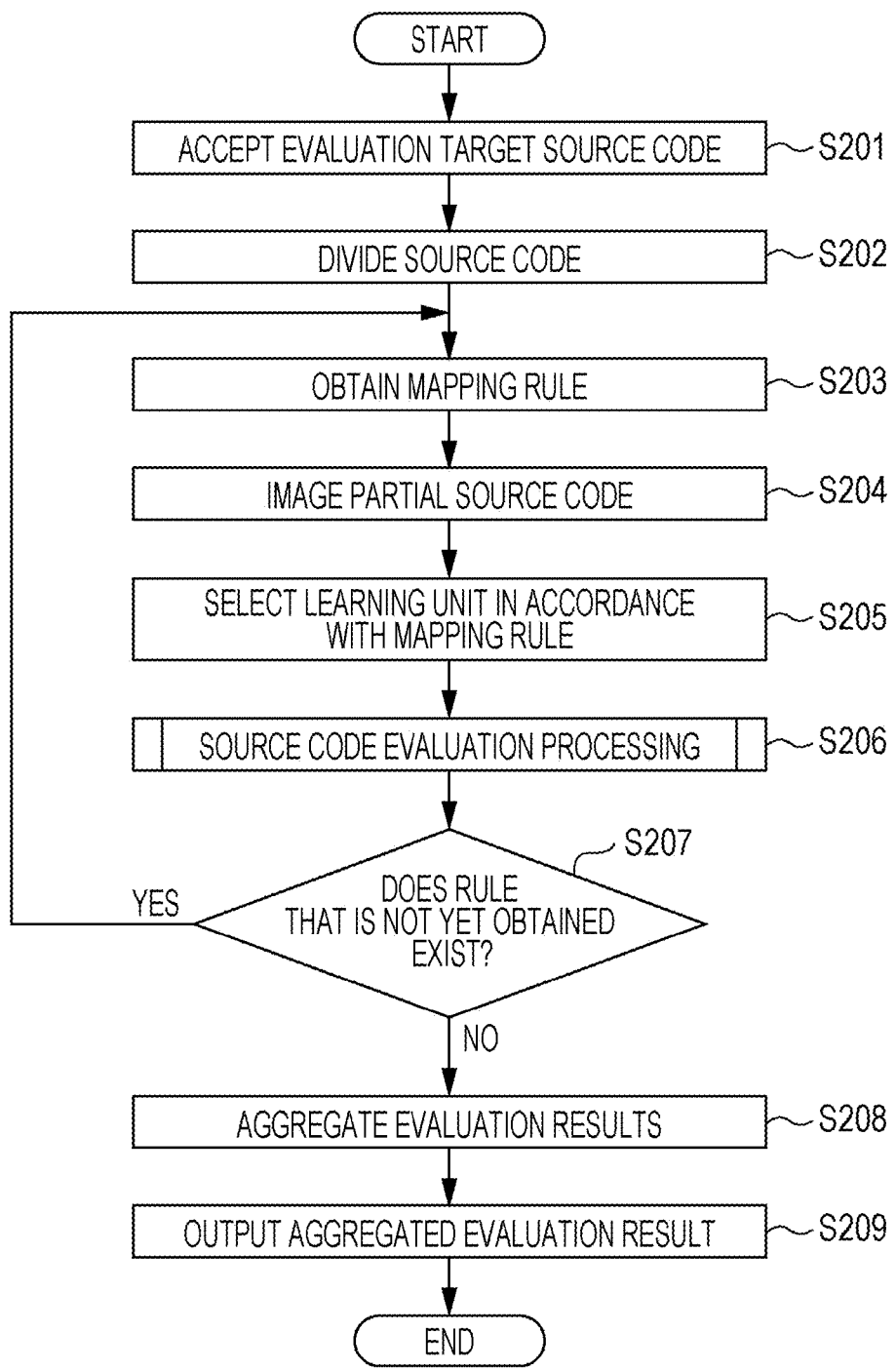
FIG. 11 is a flow chart illustrating an example of evaluation processing.

FIG. 11 is a flow chart illustrating an example of the evaluation processing. First, the control application 210 accepts a source code of the evaluation target (step S201). For example, when the control apparatus 130 transmits a storage destination and a file name of the source code which are input on a screen (evaluation screen which is not illustrated) different from the above-mentioned generation screen, the control application 210 accepts the source code identified by the storage destination and the file name of the source code as the evaluation target. When the control application 210 accepts the source code of the evaluation target, the control application 210 stores the source code of the evaluation target in the evaluation target storage unit 252.

When the processing in step S201 is completed, the source code division unit 221 then divides the source code (step S202). More specifically, the source code division unit 221 obtains the source code of the evaluation target stored in the evaluation target storage unit 252 and divides the obtained source code into a plurality of partial source codes. When the processing in step S203 is completed, the source code division unit 221 then obtains the mapping rule (step S203). That is, the source code division unit 221 obtains one of the mapping rule for the readability evaluation, the mapping rule for the complexity evaluation, and the mapping rule for the comment density evaluation.

When the processing in step S203 is completed, the source code conversion unit 222 then images the partial source code (step S204). More specifically, the source code conversion unit 222 images each of the plurality of partial source codes based on the obtained mapping rule. When the source code conversion unit 222 ends the imaging of the partial source code, the source code conversion unit 222 stores the plurality of imaged partial source codes in the unevaluated image storage unit 254 as unevaluated images (see FIG. 18B).

When the processing in step S204 is completed, the control application 210 then selects the learning unit in accordance with the mapping rule (step S205). Specifically, in a case where the source code conversion unit 222 obtains the mapping rule for the readability evaluation, the control application 210 takes out the learnt neural net with regard to the readability evaluation from the neural net storage unit 256 to be stored in the neural network library 230. When the processing in step S205 is completed, the control application 210 then executes source code evaluation processing (step S206). The source code evaluation processing is processing for evaluating the source code by dynamically evaluating an image that is not yet evaluated based on the learnt neural net. It is noted that a detail of the source code evaluation processing will be described below.

When the processing in step S206 is completed, the control application 210 then determines whether or not the mapping rule that is not yet obtained exists (step S207). For example, in the processing in step S203, in a case where the source code conversion unit 222 obtains the mapping rule for the readability evaluation but does not yet obtain the mapping rule for the complexity evaluation and the mapping rule for the comment density evaluation, the control application 210 determines that the mapping rule that is not yet obtained exists (step S207: YES). In this case, the source code conversion unit 222 executes the processing in step S203 again. That is, the source code conversion unit 222 obtains one of the mapping rule for the complexity evaluation which is not yet obtained and the mapping rule for the comment density evaluation which is not yet obtained and executes the processing in step S204 to step S206.

On the other hand, when the source code conversion unit 222 determines that the mapping rule that is not yet obtained does not exist (step S207: NO), the control application 210 aggregates the evaluation results (step S208) and outputs the aggregated evaluation result (step S209). More specifically, the control application 210 obtains and aggregates the evaluation results from the evaluation result storage unit 257 and outputs the aggregated evaluation result towards the control apparatus 130. When the control apparatus 130 receives the evaluation result, the control apparatus 130 causes the display apparatus 120 to display the evaluation result. As a result, the evaluation result appears on the display apparatus 120.

Subsequently, a detail of the above-mentioned source code evaluation processing will be described with reference to FIG. 12. It is noted that the source code evaluation processing is described as an example of the first learning unit 231, but the second learning unit 232 and the third learning unit 233 are similar to the first learning unit 231, and descriptions thereof will be omitted.

Figure 12:
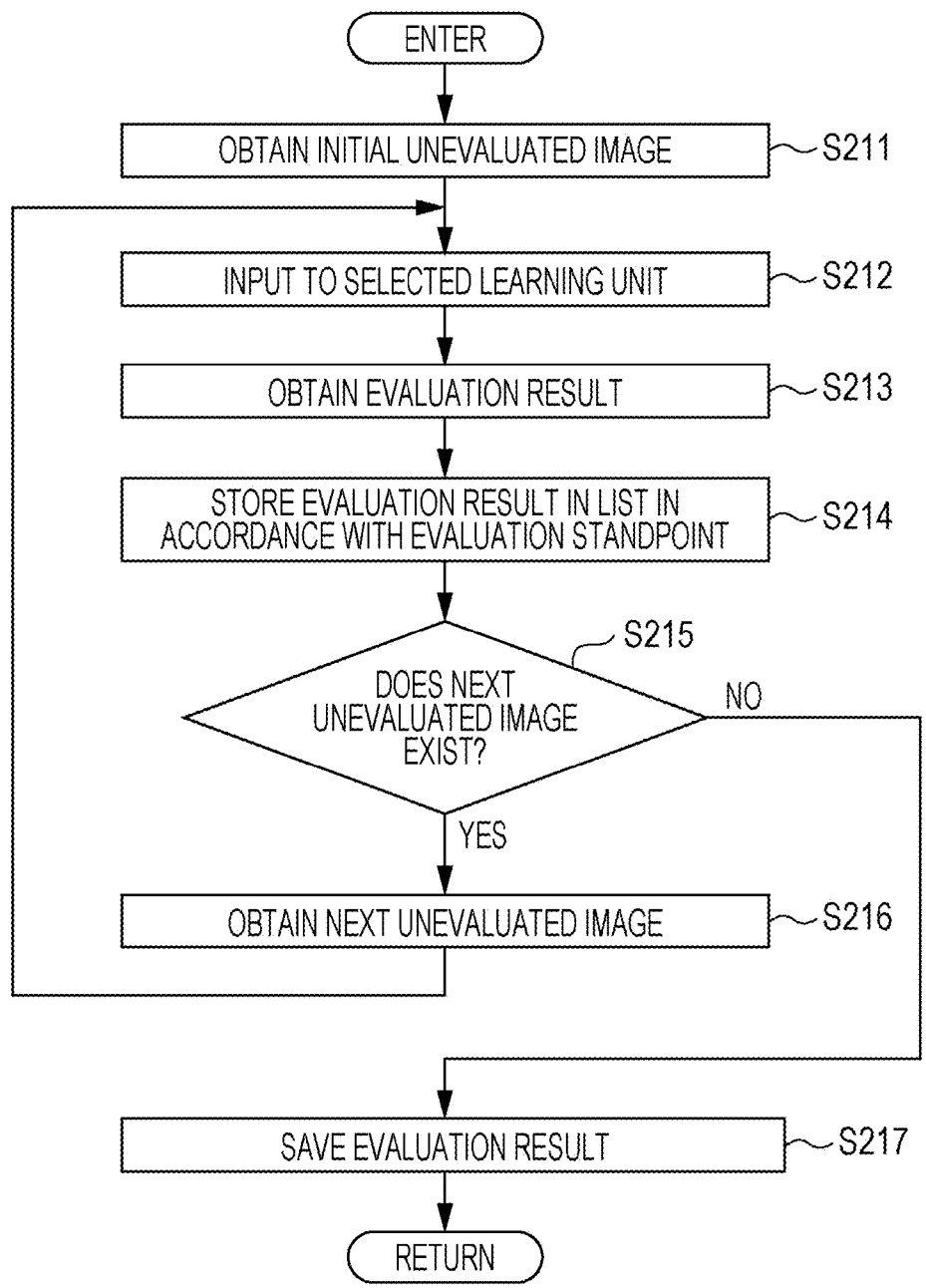
FIG. 12 is a flow chart illustrating an example of source code evaluation processing.

FIG. 12 is a flow chart illustrating an example of the source code evaluation processing. When the processing in step S205 described with reference to FIG. 11 is completed, as illustrated in FIG. 12, the control application 210 obtains the initial unevaluated image from the unevaluated image storage unit 254 (step S211). When the processing in step S211 is completed, the control application 210 then inputs the unevaluated image to the selected learning unit (step S212). For example, in a case where the control application 210 selects the first learning unit 231 in the processing in step S205, the control application 210 inputs the unevaluated image to the first learning unit 231.

When the processing in step S212 is completed, the control application 210 then obtains an evaluation result (step S213). That is, in a case where the control application 210 inputs the unevaluated image to the first learning unit 231, the first learning unit 231 obtains the evaluation result obtained by dynamically evaluating the unevaluated image by way of pattern recognition. When the processing in step S213 is completed, the control application 210 then stores the evaluation result in the list in accordance with the evaluation standpoint (step S214). For example, the control application 210 holds a list in which identification information for identifying the partial source code corresponding to the unevaluated image is associated with an empty field for storing the evaluation result. When the control application 210 obtains the evaluation result, the control application 210 stores the evaluation result in the empty field of the corresponding identification information.

When the processing in step S214 is completed, the control application 210 then determines whether or not the next unevaluated image exists (step S215). For example, when the unevaluated image where the evaluation is not ended exists in the unevaluated image storage unit 254, the control application 210 determines that the next unevaluated image exists (step S215: YES) and obtains the next unevaluated image (step S216) to repeat the processing in steps S212 to S215. As a result, the list in which the evaluation results are stored in all the above-mentioned empty fields is completed.

On the other hand, when the unevaluated image where the evaluation is not ended does not exist in the unevaluated image storage unit 254, the control application 210 determines that the next unevaluated image does not exist (step S215: NO) and saves the evaluation result in the evaluation result storage unit 257 (step S217). As a result, the evaluation result storage unit 257 stores the list where the evaluation is performed based on the evaluation standpoint of the obtained mapping rule in step S203.

FIGS. 13A, 13B, 13C, and 13D are explanatory diagrams for describing examples of the evaluation result.

Figure 13A:
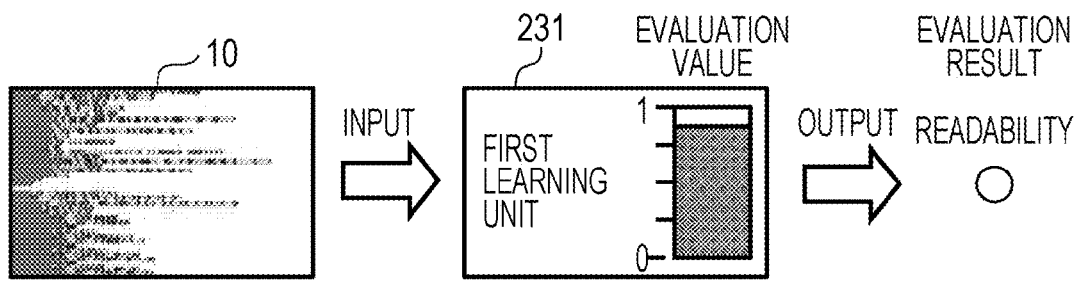
FIGS. 13A, 13B, 13C, and 13D are explanatory diagrams for describing examples of an evaluation result.
Figure 13B:
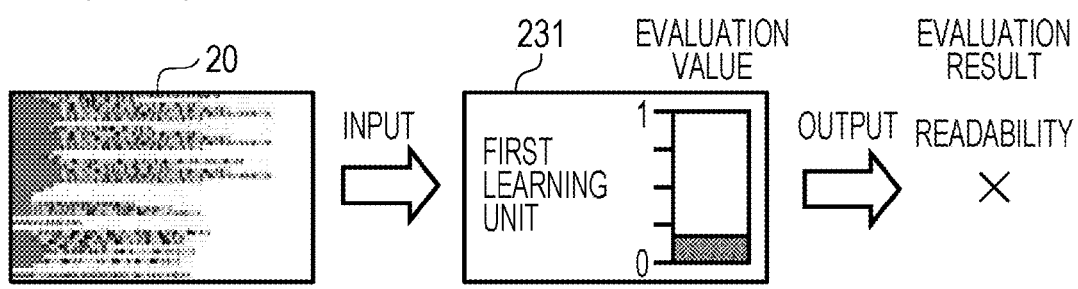

First, as illustrated in FIG. 13A, for example, when an unevaluated image 10 corresponding to a partial source code X (not illustrated) is input to the first learning unit 231, the first learning unit 231 calculates an evaluation value with respect to the unevaluated image 10 based on the learnt neural net with regard to the readability evaluation and outputs the evaluation result "0" with respect to the partial source code X when the calculated evaluation value is higher than or equal to a predetermined threshold (for example, 0.5). As illustrated in FIG. 13B, for example, when an unevaluated image 20 corresponding to a partial source code Y (not illustrated) is input to the first learning unit 231, the first learning unit 231 calculates an evaluation value with respect to the unevaluated image 20 based on the learnt neural net with regard to the readability evaluation and outputs the evaluation result "x" with respect to the partial source code Y when the calculated evaluation value is lower than a predetermined threshold.

Figure 13C:
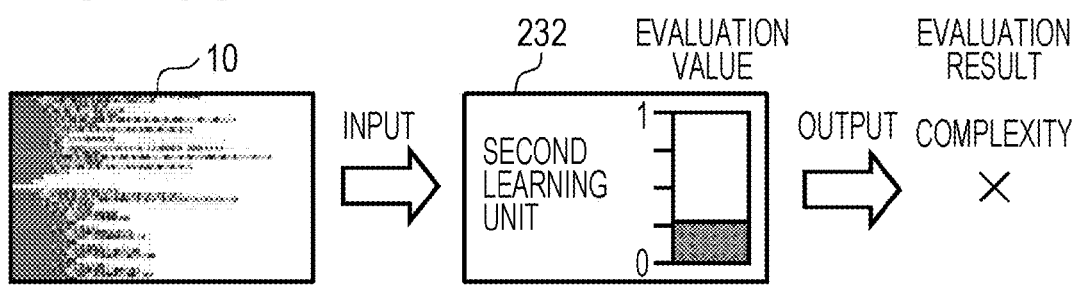
Figure 13D:
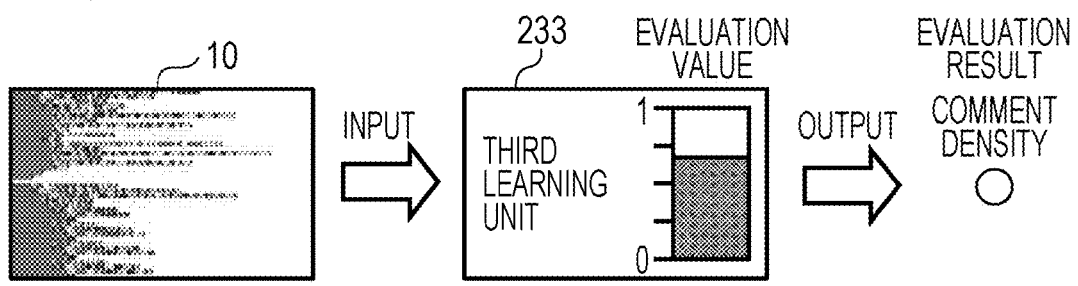

For example, as illustrated in FIG. 13C, when the unevaluated image 10 corresponding to the partial source code X is input to the second learning unit 232, the second learning unit 232 calculates the evaluation value with respect to the unevaluated image 10 based on the learnt neural net with regard to the complexity evaluation and outputs the evaluation result "x" with respect to the partial source code X when the calculated evaluation value is lower than a predetermined threshold. In addition, as illustrated in FIG. 13D, for example, when the unevaluated image 10 corresponding to the partial source code X is input to the third learning unit 233, the third learning unit 233 calculates the evaluation value with respect to the unevaluated image 10 based on the learnt neural net with regard to the comment density evaluation and outputs the evaluation result "0" with respect to the partial source code X when the calculated evaluation value is higher than or equal to a predetermined threshold.

As described above, according to the first exemplary embodiment, the server apparatus 200 includes the imaging tool 220. The imaging tool 220 includes the source code division unit 221 and the source code conversion unit 222, and the source code division unit 221 divides the source code functioning as the training data into the plurality of partial source codes. On the other hand, the source code conversion unit 222 obtains the mapping rule for replacing the characters with the different colors based on whether the programming language is the previously defined character or the character that can be arbitrarily defined or the like and replaces the characters included in the partial source code into the colors based on the obtained mapping rule. The source code conversion unit 222 then converts the partial source code where the characters are replaced with the colors into the image. When the above-mentioned image is used, it is possible to efficiently evaluate the source code.

Second Exemplary Embodiment

Subsequently, a second exemplary embodiment of the present disclosure will be described with reference to FIG. 14 and FIG. 15.

Figure 14:
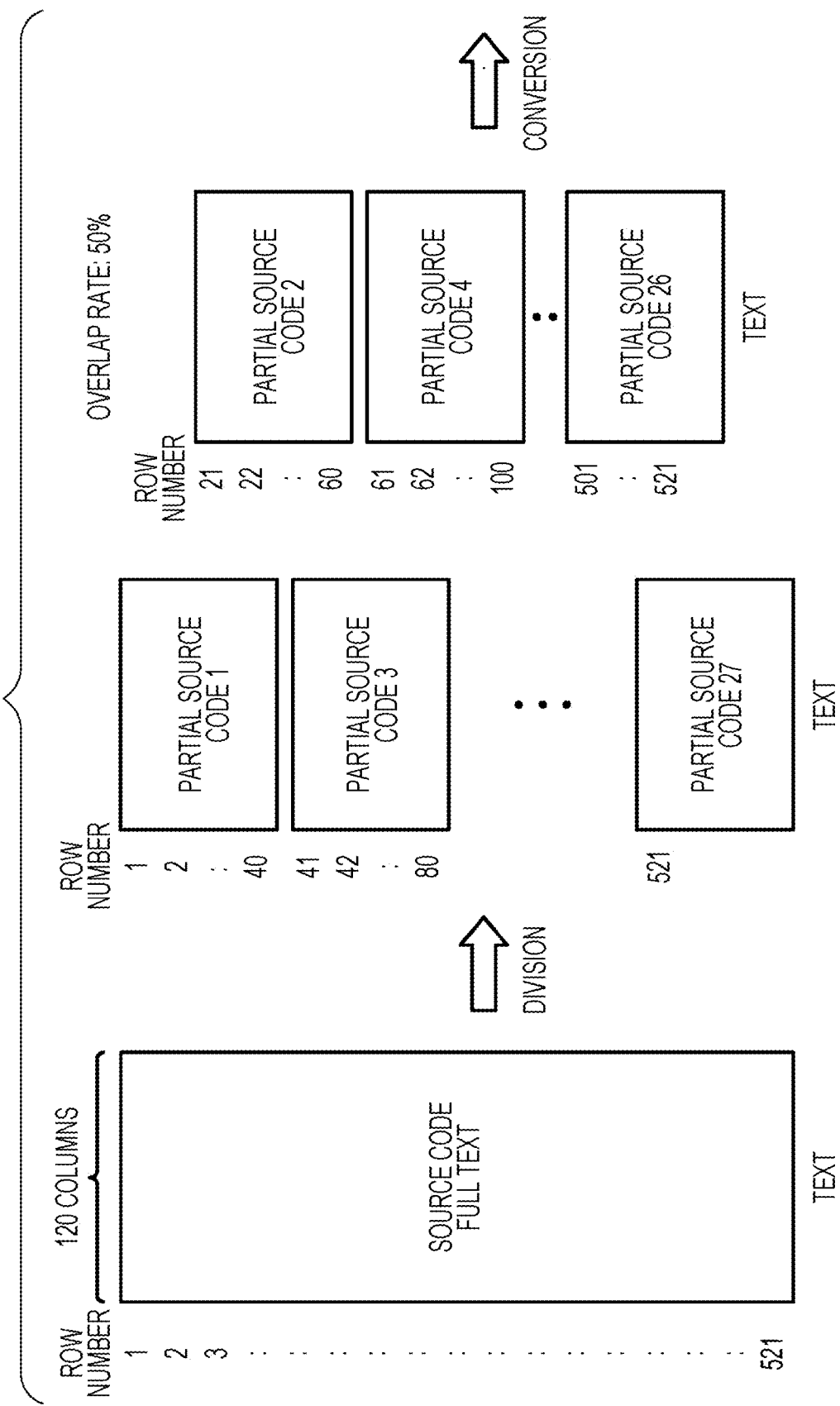
FIG. 14 is an explanatory diagram for describing an example of the processing of the imaging tool (part 1) according to a second exemplary embodiment.
Figure 15:
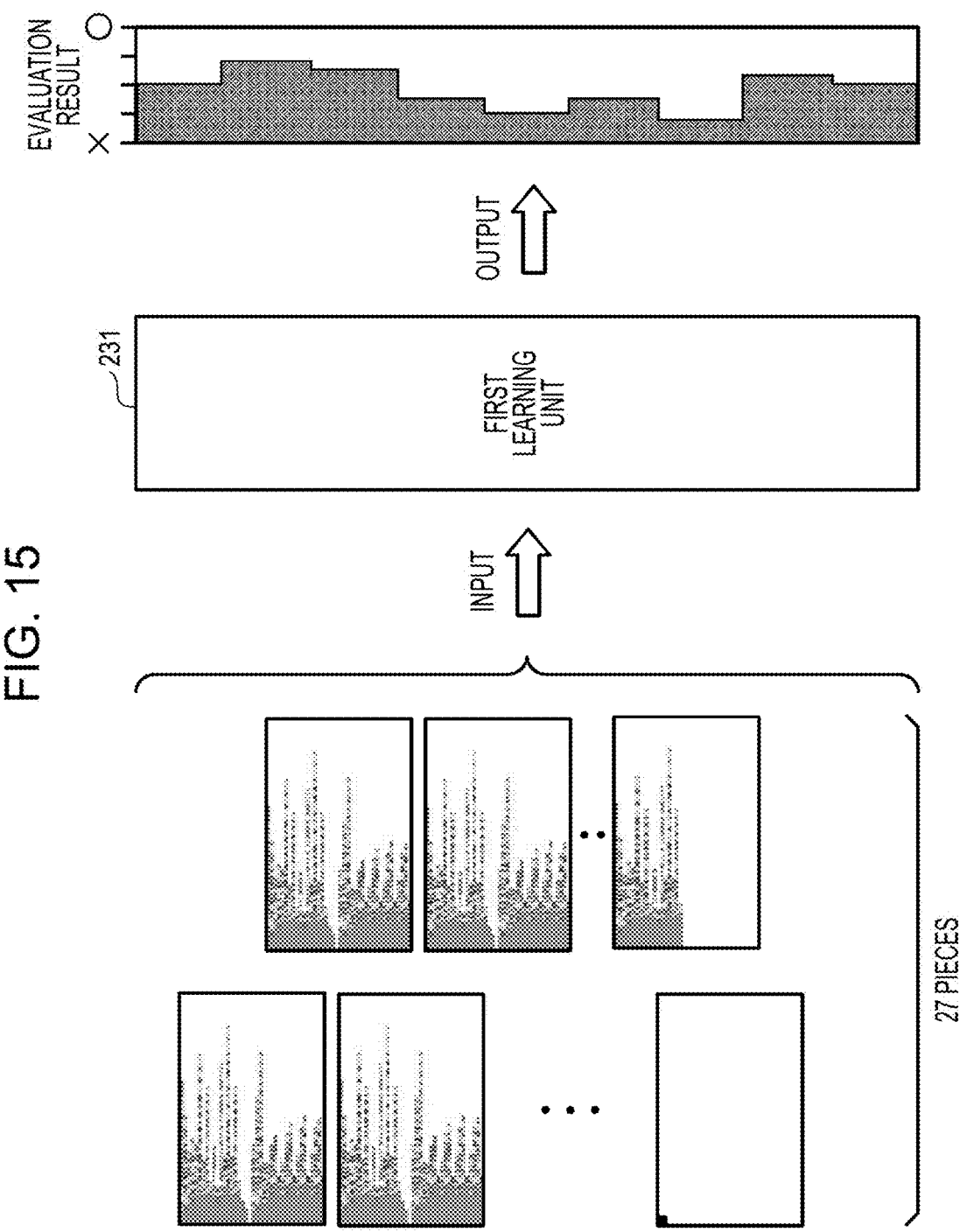
FIG. 15 is an explanatory diagram for describing an example of the processing of the imaging tool (part 2) according to the second exemplary embodiment.

FIG. 14 is an explanatory diagram for describing an example of processing of the imaging tool 220 according to the second exemplary embodiment (part 1). FIG. 15 is an explanatory diagram for describing an example of processing of the imaging tool 220 according to the second exemplary embodiment (part 2).

As described in step S201 of FIG. 11, the control application 210 accepts the source code of the evaluation target according to the first exemplary embodiment, but the control application 210 may accept an overlap rate together with the source code of the evaluation target. The overlap rate is input, for example, on the evaluation screen described according to the first exemplary embodiment.

For example, when the control application 210 accepts the overlap rate "50%", the source code division unit 221 divides the source code of the evaluation target into a plurality of partial source codes 1 to 27 as illustrated in FIG. 14. In particular, in a case where the source code division unit 221 divides the source code in units of 40 rows, the source code division unit 221 overlaps 20 rows corresponding to 50% of 40 rows and divides the source code of the evaluation target for every 20 rows. As a result, the source code division unit 221 generates 27 partial source codes.

When the source code division unit 221 ends the division of the source code of the evaluation target, then, the source code conversion unit 222 converts the plurality of partial source codes into images. That is, in a case where the source code division unit 221 generates the 27 partial source codes, as illustrated in FIG. 15, the source code conversion unit 222 converts the 27 partial source codes into 27 images. After the conversion, the source code conversion unit 222 stores these images in the unevaluated image storage unit 254 as the unevaluated images.

When the unevaluated image storage unit 254 stores the unevaluated image, the control application 210 then obtains the unevaluated image from the unevaluated image storage unit 254 to be input to the first learning unit 231. In a case where the image where the overlap rate is used is input to the first learning unit 231, the first learning unit 231 outputs the calculated evaluation values to the respective unevaluated images in a histogram format as the evaluation result as illustrated in FIG. 15 instead of individually outputting the evaluation results as in the first exemplary embodiment. As compared with a case where the evaluation results are individually output, since the evaluation between the partial source codes is interpolated, the evaluation result is smoothed. As a result, it is possible to smoothly understand the overall evaluation result with respect to the source code full text.

Third Exemplary Embodiment

Subsequently, a third exemplary embodiment of the present disclosure will be described with reference to FIG. 16 and FIG. 17.

Figure 16:
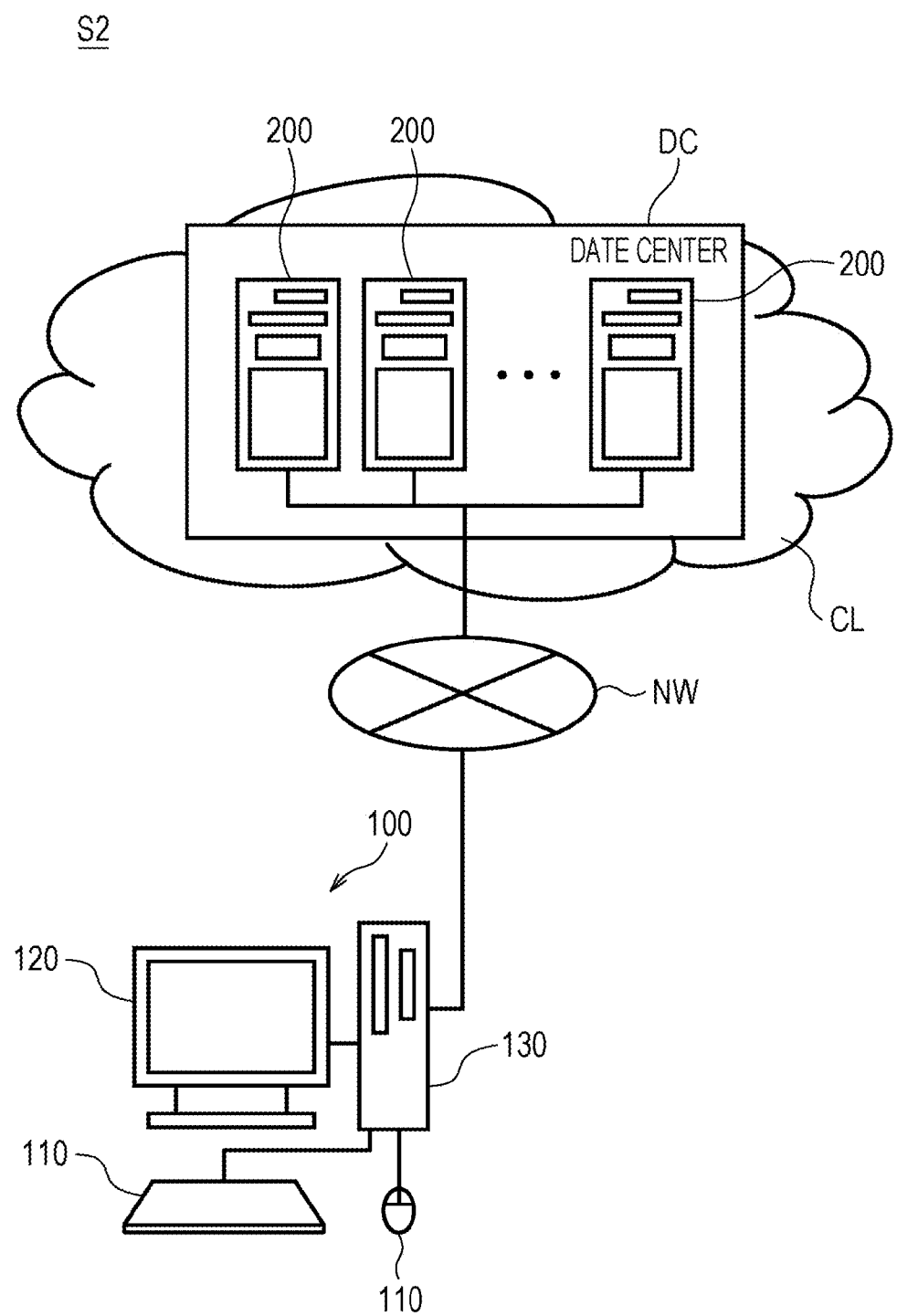
FIG. 16 illustrates an example of a code review system according to a third exemplary embodiment.

FIG. 16 illustrates an example of a code review system S2 according to the third exemplary embodiment. FIG. 17 is a block diagram example of the control apparatus 130 and the server apparatus 200 according to the third exemplary embodiment. The case has been described according to the first exemplary embodiment where the terminal apparatus 100 and the server apparatus 200 exist in the same base, but the server apparatus 200 may exist in a different base from that of the terminal apparatus 100 as illustrated in FIG. 16. For example, the server apparatus 200 may be installed in a data center DC on a cloud CL. In this case, the internet is used as the communication network NW.

Figure 17:
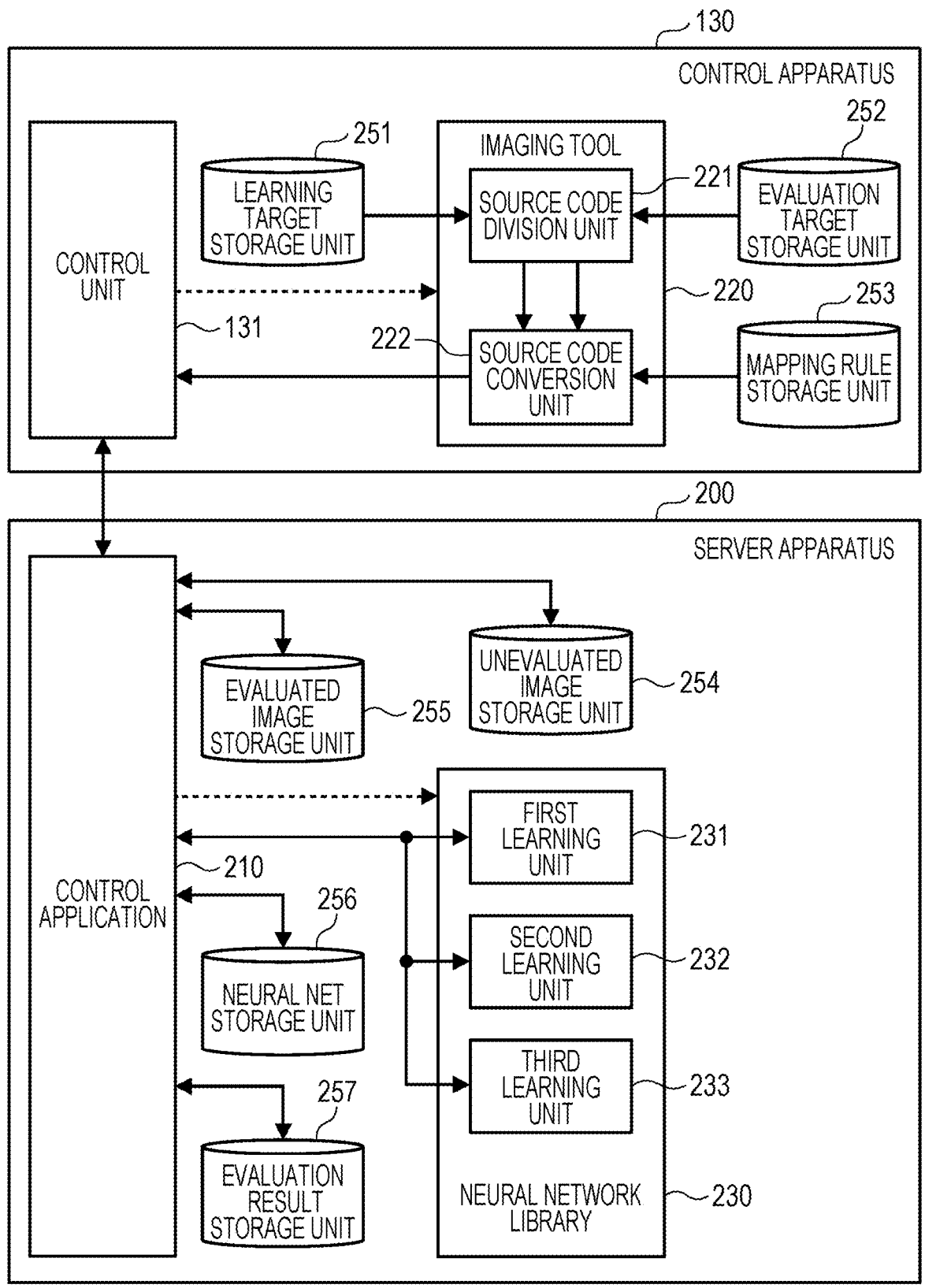
FIG. 17 is a block diagram example of a control apparatus and the server apparatus according to the third exemplary embodiment.

As illustrated in FIG. 16, in a case where the server apparatus 200 exists in a base different from that of the terminal apparatus 100, the control apparatus 130 may include the above-mentioned imaging tool 220 as illustrated in FIG. 17. In this case, the control apparatus 130 may also include the learning target storage unit 251, the evaluation target storage unit 252, and the mapping rule storage unit 253 together with the imaging tool 220.

The control application 210 controls the imaging tool 220 according to the first exemplary embodiment, but a control unit 131 of the control apparatus 130 controls the imaging tool 220 according to the third exemplary embodiment. For example, the control unit 131 transmits the unevaluated image output from the source code conversion unit 222 towards the unevaluated image storage unit 254 and transmits the evaluated image towards the evaluated image storage unit 255. As a result, the server apparatus 200 performs the learning based on the evaluated image stored in the evaluated image storage unit 255 and performs the evaluation of the unevaluated image stored in the unevaluated image storage unit 254. When the evaluation of the image is completed, the control application 210 obtains the evaluation result from the evaluation result storage unit 257 to be transmitted to the control unit 131. As a result, the control unit 131 displays the evaluation result on the display apparatus 120. In this manner, when the imaging of the source code can be executed on the terminal apparatus 100 side, the source code is not circulated on the communication network NW, and leaking of the source code is avoided.

The exemplary embodiments of the present disclosure have been described above in detail but are not limited to particular exemplary embodiments of the present disclosure, and various modifications and alterations can be made within the gist of the present disclosure described in the scope of claims. For example, according to the above-mentioned first exemplary embodiment to the third exemplary embodiment, the descriptions have been provided by using the symbols such as the evaluation results "○" and "x", but the evaluation result may be finely evaluated in three or more grades by using symbols such as "○", "x", and "Δ", for example. Numeric values representing higher and lower grades may also be used instead of the symbols.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium storing a program, which when executed by a computer, causes the computer to execute a process comprising:
   obtaining a source code;
   generating an image of color information by executing conversion processing with regard to the source code while following a rule for replacing a character with a color in accordance with a type of the character; and
   outputting the generated image of color information.

2. The non-transitory computer-readable medium according to claim 1, wherein the rule is a rule for replacing characters with different colors for each evaluation standpoint with respect to the source code.

3. The non-transitory computer-readable medium according to claim 1, wherein the process further comprises:
   obtaining another source code;
   generating another image of color information by executing the conversion processing with regard to the other source code while following the rule; and
   outputting an evaluation result with respect to the other source code based on a pattern recognition of the image of color information and the another image of color information.

4. The non-transitory computer-readable medium according to claim 3, wherein the outputting includes outputting different evaluation results for each evaluation standpoint with respect to the other source code based on the pattern recognition of the image of color information and the another image of color information.

5. The non-transitory computer-readable medium according to claim 3, wherein the process further comprises:
   dividing the source code into a plurality of partial source codes that are partially superimposed with one another;
   dividing the other source code into a plurality of other partial source codes that are partially superimposed with one another; and
   generating the image of color information by executing the conversion processing with respect to the plurality of divided partial source codes and the plurality of other partial source codes while following the rule.

6. An information processing apparatus, comprising:
   a memory; and
   a processor coupled to the memory and configured to:
   obtain a source code,
   generate an image of color information by executing conversion processing with regard to the source code while following a rule for replacing a character with a color in accordance with a type of the character, and
   output the generated image of color information.

7. The information processing apparatus according to claim 6, wherein the rule is a rule for replacing characters with different colors for each evaluation standpoint with respect to the source code.

8. The information processing apparatus according to claim 6, wherein the processor is further configured to
   obtain another source code, generate another image of color information by executing the conversion processing with regard to the other source code while following the rule, and output an evaluation result with respect to the other source code based on a pattern recognition of the image of color information and the another image of color information.

9. The information processing apparatus according to claim 8, wherein the processor outputs different evaluation results for each evaluation standpoint with respect to the other source code based on the pattern recognition of the image of color information and the another image of color information.

10. The information processing apparatus according to claim 8, wherein the processor is further configured to divide the source code into a plurality of partial source codes that are partially superimposed with one another, divide the other source code into a plurality of other partial source codes that are partially superimposed with one another, and non-transitory computer-readable medium generate the image of color information by executing the conversion processing with respect to the plurality of divided partial source codes and the plurality of other partial source codes while following the rule.

11. A computer-implemented method for evaluating source code, the method comprising:

receiving a target source code to be evaluated with a neural network;

converting the target source code into at least one image in which characters of the target source code are replaced with color based on a mapping rule;

selecting the neural network to evaluate the at least one image;

evaluating the at least one image with the selected neural network; and outputting an evaluation result of the target source code based on the evaluating.

12. The method of claim 11, wherein the converting the target source code into the at least one image includes:

generating color information by executing conversion processing with regard to the target source code according the mapping rule for converting a character into a color or converting a color of a character in accordance with a type of the character, and outputting the generated color information as the at least one image.

13. The method of claim 11, further comprising:

dividing the target source code into a plurality of partial source codes, and wherein each partial source code is converted into an image of the at least one image.

14. The method of claim 13, wherein the divided partial source are partially superimposed with one another.

15. The method of claim 11, wherein each mapping rule is associated with an evaluation standpoint and each of the converting, selecting and evaluating are performed for a plurality of evaluation standpoints, and the plurality of evaluation standpoints include a readability evaluation standpoint for the target source code, a complexity evaluation standpoint for the target source code, and a comment density evaluation for the target source code.

16. The method of claim 11, further comprising:

obtaining training data for at least one evaluation standpoint for evaluating source code, the at least one evaluation standpoint including at least one of readability, complexity and comment density of the source code.

17. The method of claim 16, wherein the training data includes an evaluator's analysis of a training source code that is mapped into an image according to the mapping rule for each of the at least one evaluation standpoint.

18. The method of claim 16, wherein the neural network includes a learnt neural net for each of a plurality of evaluation standpoints for evaluating the target source code and the selecting selects the neural net of the neural network for the evaluating according to the mapping rule corresponding to one of the plurality of evaluation standpoints.

19. The method of claim 18, further comprising:

receiving a training source code;

dividing the training source code into a plurality of partial training source codes;

converting the plurality of partial training source codes into a plurality of images according to the mapping rule for each of the plurality of evaluation standpoints;

generating, with a control application of a server apparatus, a learning unit based on the plurality of images;

initializing the learning unit to receive the training data;

processing the training data with the learning unit to develop the learnt neural net for each of the plurality of evaluation standpoints.

20. The method of claim 19, wherein the converting includes generating color information by executing conversion processing with regard to the target source code according the mapping rule for converting a character into a color or converting a color of a character in accordance with a type of the character, and outputting the generated color information as the at least one image, and —and the evaluating dynamically evaluates the color information with the learnt neural net using pattern recognition.

* * * * *